US011805073B2

(12) United States Patent
Navali et al.

(10) Patent No.: US 11,805,073 B2
(45) Date of Patent: Oct. 31, 2023

(54) CONTROLLING PLACEMENT OF WORKLOADS OF AN APPLICATION WITHIN AN APPLICATION ENVIRONMENT

(71) Applicant: Avesha, Inc., Bedford, MA (US)

(72) Inventors: Prabhudev Navali, Westford, MA (US); Raj Nair, Lexington, MA (US); Prasad Dorbala, Lexington, MA (US); Sudhir Halbhavi, Bangalore (IN); Sai Koti Reddy Danda, Narasaraopeta (IN)

(73) Assignee: Avesha, Inc., Chelmsford, MA (US)

( * ) Notice: Subject to any disclaimer, the term of this patent is extended or adjusted under 35 U.S.C. 154(b) by 0 days.

(21) Appl. No.: 17/735,434

(22) Filed: May 3, 2022

(65) Prior Publication Data

US 2022/0353201 A1    Nov. 3, 2022

Related U.S. Application Data

(60) Provisional application No. 63/183,244, filed on May 3, 2021.

(51) Int. Cl.
*H04L 47/80* (2022.01)
*H04L 47/762* (2022.01)
(Continued)

(52) U.S. Cl.
CPC ........ *H04L 47/803* (2013.01); *G06F 9/45558* (2013.01); *G06F 9/5072* (2013.01);
(Continued)

(58) Field of Classification Search
CPC ... H04L 47/803; H04L 47/125; H04L 47/762; H04L 47/781; G06F 9/5072;
(Continued)

(56) References Cited

U.S. PATENT DOCUMENTS 9,003,432 B1   4/2015 Pellowski et al.
10,621,005 B2  4/2020 Wong et al.
(Continued)

FOREIGN PATENT DOCUMENTS

EP   2904491 B1   9/2017
EP   3792760 A1   3/2021
(Continued)

OTHER PUBLICATIONS

Chang, Yi, et al.; "Dynamic Weight Based Load Balancing for Microservice Cluster", Computer Science and Application Engineering, Oct. 22, 2018, pp. 1-7.
(Continued)

*Primary Examiner* — Ruolei Zong
(74) *Attorney, Agent, or Firm* — BainwoodHuang

(57) ABSTRACT

A technique is directed toward controlling placement of workloads of an application within an application environment. The technique involves, while a first placement of workloads of the application is in a first deployment of resources within the application environment, generating a set of resource deployment changes that accommodates a predicted change in demand on the application. The technique further involves adjusting the first deployment of resources within the application environment to form a second deployment of resources within the application environment, the second deployment of resources being different from the first deployment of resources. The technique further involves providing a second placement of workloads of the application in the second deployment of resources to accommodate the predicted change in demand on the application, the second placement of workloads being different from the first placement of workloads.

20 Claims, 18 Drawing Sheets

(51) Int. Cl.
  *H04L 47/78* (2022.01)
  *H04L 47/125* (2022.01)
  *G06F 9/455* (2018.01)
  *G06F 9/50* (2006.01)

(52) U.S. Cl.
  CPC .......... *G06F 9/5077* (2013.01); *H04L 47/125* (2013.01); *H04L 47/762* (2013.01); *H04L 47/781* (2013.01); *G06F 2009/4557* (2013.01); *G06F 2209/501* (2013.01); *G06F 2209/505* (2013.01)

(58) Field of Classification Search
  CPC .... G06F 9/5077; G06F 9/45558; G06F 9/505; G06F 9/5027
  USPC .......................................................... 709/226
  See application file for complete search history.

(56) References Cited

U.S. PATENT DOCUMENTS

| | | | |
|---|---|---|---|
| 10,749,813 B1* | 8/2020 | Zhao | H04L 47/826 |
| 2017/0099346 A1 | 4/2017 | Eisenbud et al. | |
| 2018/0331969 A1* | 11/2018 | Chen | G06F 9/5083 |
| 2018/0349797 A1* | 12/2018 | Garvey | G06F 9/46 |
| 2019/0102717 A1* | 4/2019 | Wu | H04L 41/147 |
| 2019/0273746 A1 | 9/2019 | Coffing | |
| 2020/0136987 A1* | 4/2020 | Nakfour | H04L 67/1097 |
| 2020/0153699 A1 | 5/2020 | Bai et al. | |
| 2020/0257566 A1 | 8/2020 | Ganguli et al. | |
| 2020/0287962 A1 | 9/2020 | Mishra et al. | |
| 2020/0314173 A1 | 10/2020 | Pahwa et al. | |
| 2020/0336369 A1 | 10/2020 | Ratnasamy et al. | |
| 2021/0014141 A1 | 1/2021 | Patil et al. | |
| 2021/0019194 A1 | 1/2021 | Bahl et al. | |
| 2021/0099829 A1 | 4/2021 | Soto et al. | |
| 2021/0112049 A1 | 4/2021 | Yigit et al. | |
| 2021/0144517 A1 | 5/2021 | Guim Bernat et al. | |
| 2021/0211371 A1 | 7/2021 | Ceccarelli et al. | |
| 2021/0240517 A1* | 8/2021 | Mohapatra | G06N 20/00 |
| 2021/0357255 A1* | 11/2021 | Mahadik | G06F 11/3006 |
| 2022/0014963 A1 | 1/2022 | Yeh et al. | |
| 2022/0060431 A1* | 2/2022 | Vadayadiyil Raveendran | H04L 41/12 |
| 2022/0121455 A1 | 4/2022 | Hoban et al. | |

FOREIGN PATENT DOCUMENTS

| | | | |
|---|---|---|---|
| WO | WO-2008119929 A2 * | 10/2008 | ......... H04L 41/5003 |
| WO | 2018053122 A1 | 3/2018 | |
| WO | 2020252390 A1 | 12/2020 | |

OTHER PUBLICATIONS

Niu Yipei, et al.; "Load Balancing Across Microservices", IEEE Infocom 2018—IEEE Conference on Computer Communications, Apr. 16, 2018, pp. 198-206.
Samreen Faiza; "Q-Learning Scheduler and Load Balancer for Heterogeneous Systems", Journal of Applied Sciences, Jan. 1, 2007, pp. 1504-1510.
Buzachis, Alina, et al.: "Towards Osmotic Computing: Analyzing Overlay Network Solutions to Optimize the Deployment of Container-Based Microservices in Fog, Edge and IoT Environments", 2018 IEEE 2nd International Conference on Fog and Edge Computing (ICFEC), IEEE, May 1, 2018 (May 1, 2018), pp. 1-10.
U.S. Appl. No. 62/914,974 (Year: 2019).
Nicolas, et al.; "Proactive Autoscaling for Cloud-Native Applications Using Machine Earning", Globecom 2020—2020 IEEE Global Communications Conference, IEEE, Dec. 7, 2020, pp. 1-7.
International Search Report and the Written Opinion from the International Searching Authority (EPO) for International Application No. PCT/US2022/027406 filed May 3, 2022, 39 pages.
Anonymous: "Horizontal Pod Autoscaler Kubernetes", May 1, 2021, pp. 1-8.
Anonymous: "Kubernetes Autoscaling in Production: Best Practices for Cluster Autoscaler, HPA and VPA", Apr. 13, 2021, pp. 1-17.
Anonymous: "Dynamic Network Slicing: Challenges and Opportunities Springerlink", May 29, 2020, pp. 1-41.

* cited by examiner

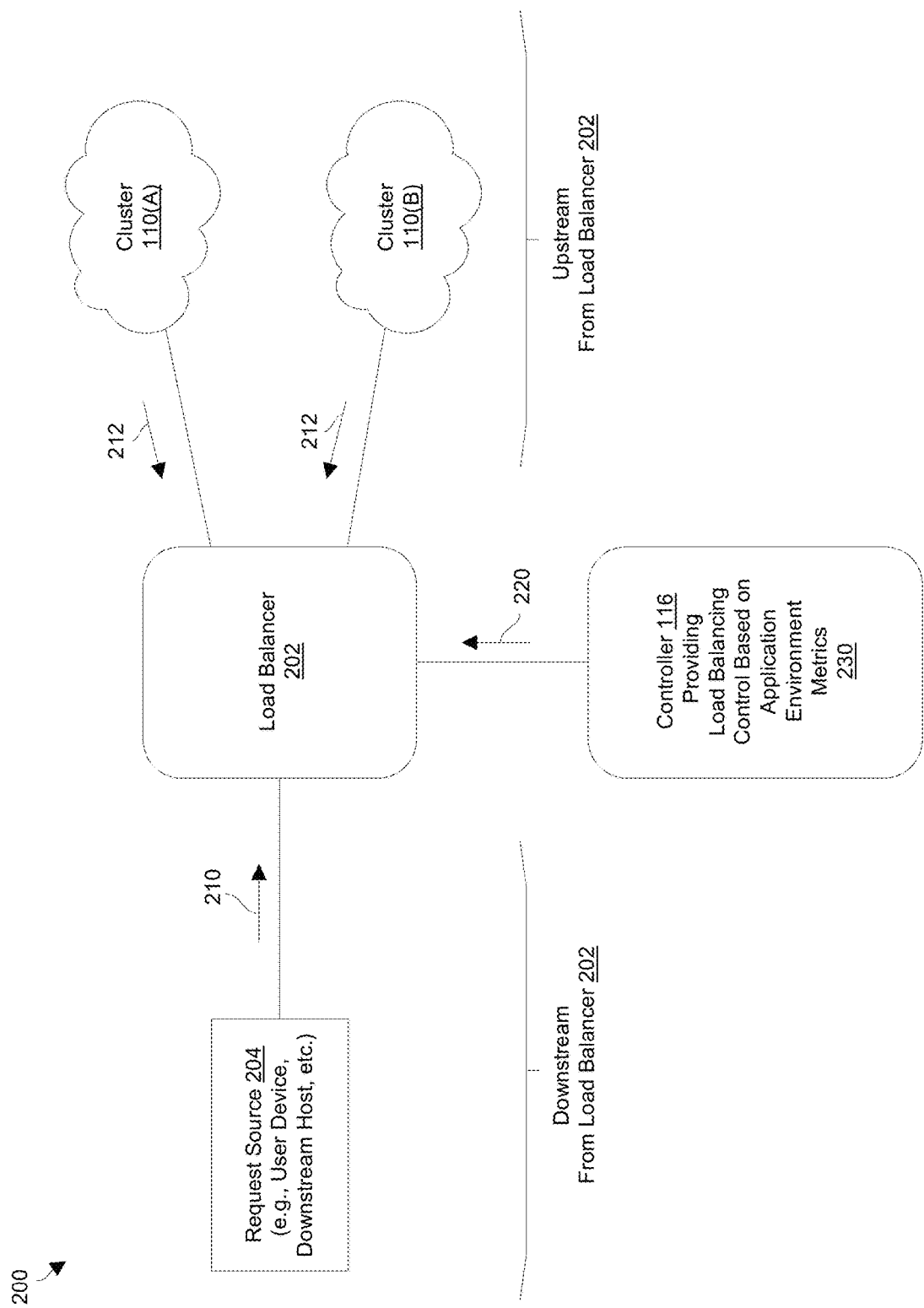

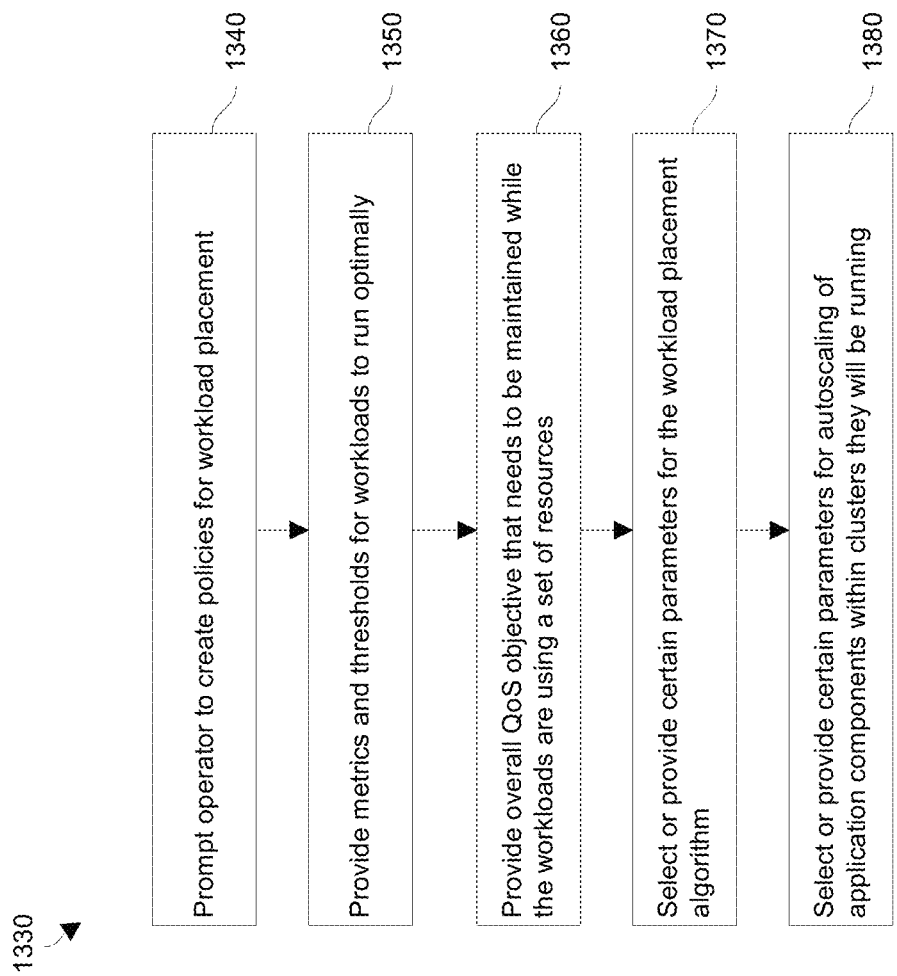

CONTROLLING PLACEMENT OF WORKLOADS OF AN APPLICATION WITHIN AN APPLICATION ENVIRONMENT

CROSS REFERENCE TO RELATED APPLICATIONS

This application is a regular utility application based on earlier-filed U.S. Application No. 63/183,244 filed on May 3, 2021, entitled "Smart Application Framework", the contents and teachings of which are hereby incorporated by reference in their entirety.

BACKGROUND

A monolithic application may consist of a few tightly coupled application components generated from a large code base. Such components may include a client-side component (e.g., a GUI, browser code, etc.), a server-side component (e.g., data processing logic, a webserver, etc.), one or more databases, and so on.

In contrast to a monolithic application, an application that uses a microservices architecture is typically constructed from a collection of small independent microservice units. Such microservice units have their own coding/logic, databases, etc., and are able to provide independent (or loosely coupled) microservices.

SUMMARY

For an application that uses a microservices architecture, requests for microservices may be sent to microservice units (e.g., upstream hosts) that provide the microservices. As long as the microservice units are properly provisioned with enough compute resources to locally support the microservices, the application should perform properly.

However, suppose that the microservice units are under-provisioned. In such a situation, the application will provide degraded performance and perhaps even operate improperly. Along these lines, an under-provisioned microservice unit may cause a fault condition in which the microservice fails to deliver or perform (e.g., non-compliance) according to certain criteria/requirements such as response time, throughput, tasks/second, combinations thereof, and so on.

To prevent such fault conditions, application operators may overprovision the microservices application with more compute resources than necessary (e.g., by adding more network resources, more CPU power, more memory, more microservice units, etc.). If such overprovisioning is minimal, the microservices application is still susceptible to degraded performance, fault conditions, etc. However, if such overprovisioning is excessive, the situation is wasteful, expensive, and perhaps still ineffective.

Due to the number of microservices, connections, servers, etc. in play, it is impractical for an application operator to manually manage compute resource provisioning for a microservices application. Moreover and unfortunately, conventional attempts by application operators to automate compute resource provisioning to a microservices application requires encountering a fault event (e.g., crossing a non-compliance threshold) before a response is provided that allocates further compute resources to the microservices application.

In contrast to the above-described conventional provisioning approaches, improved techniques are directed to controlling placement of workloads of an application within an application environment by predicting a future change in demand on the application. Such predicting enables proactive scaling of resources within the application environment ahead of an actual change in demand thus efficiently applying resources and avoiding fault events (e.g., non-compliance). With such improved techniques, the application environment is able to provide more efficient and effective performance (e.g., improved traffic flow, lower latency, higher throughput, optimized connections, better balanced server loads, cost effectiveness, fault avoidance, combinations thereof, etc.). Moreover, such techniques are able to improve application performance automatically thus avoiding drawbacks such as ineffective and wasteful overprovisioning and/or situations of having to react to encountered degraded/fault conditions.

One embodiment is directed to a method of controlling placement of workloads of an application within an application environment. The method includes, while a first placement of workloads of the application is in a first deployment of resources within the application environment, generating a set of resource deployment changes that accommodates a predicted change in demand on the application. The method further includes adjusting the first deployment of resources within the application environment to form a second deployment of resources within the application environment, the second deployment of resources being different from the first deployment of resources. The method further includes providing a second placement of workloads of the application in the second deployment of resources to accommodate the predicted change in demand on the application, the second placement of workloads being different from the first placement of workloads.

Another embodiment is directed to electronic circuitry which includes memory and control circuitry coupled to the memory. The memory stores instructions which, when carried out by the control circuitry, cause the control circuitry to perform a method of:
(A) while a first placement of workloads of an application is in a first deployment of resources within an application environment, generating a set of resource deployment changes that accommodates a predicted change in demand on the application,
(B) adjusting the first deployment of resources within the application environment to form a second deployment of resources within the application environment, the second deployment of resources being different from the first deployment of resources, and
(B) providing a second placement of workloads of the application in the second deployment of resources to accommodate the predicted change in demand on the application, the second placement of workloads being different from the first placement of workloads.

Yet another embodiment is directed to a computer program product having a non-transitory computer readable medium which stores a set of instructions to control placement of workloads of an application within an application environment. The set of instructions, when carried out by computerized circuitry, causes the computerized circuitry to perform a method of:
(A) while a first placement of workloads of the application is in a first deployment of resources within the application environment, generating a set of resource deployment changes that accommodates a predicted change in demand on the application;
(B) adjusting the first deployment of resources within the application environment to form a second deployment of resources within the application environment, the second deployment of resources being different from the first deployment of resources; and (C) providing a second placement of workloads of the application in the second deployment of resources to accommodate the predicted change in demand on the application, the second placement of workloads being different from the first placement of workloads.

In some arrangements, the application environment includes a plurality of clusters, each cluster of the plurality of clusters providing computing resources that are virtualized into containers which are arranged into pods. Additionally, adjusting the first deployment of resources within the application environment to form the second deployment of resources within the application environment includes changing a number of pods allocated to the application by a cluster of the plurality of clusters of the application environment.

In some arrangements, the cluster includes an initial number of pods allocated to the application and a pod scaling circuit. Additionally, changing the number of pods allocated to the application by the cluster includes providing a signal to the pod scaling circuit that directs the pod scaling circuit to increase the number of pods allocated to the application by the cluster from the initial number of pods to a target number of pods that is greater than the initial number of pods to proactively address the predicted change in demand on the application. Similarly, in some arrangements, a signal may be provided to the pod scaling circuit that directs the pod scaling circuit to decrease the number of pods to proactively address predicted changes in demand on the application (e.g., to reduce or de-allocate resources when predicted demand is low).

In some arrangements, the application environment includes a plurality of clusters, each cluster of the plurality of clusters providing computing resources on compute nodes. Additionally, adjusting the first deployment of resources within the application environment to form the second deployment of resources within the application environment includes changing a number of compute nodes allocated to the application by a cluster of the plurality of clusters of the application environment.

In some arrangements, the cluster includes a plurality of compute nodes and a node scaling circuit. Additionally, changing the number of compute nodes allocated to the application by the cluster includes providing a signal to the node scaling circuit that directs the node scaling circuit to increase a first number of compute nodes allocated to the application by the cluster to a second number of compute nodes allocated to the application by the cluster to proactively address the predicted change in demand on the application. Similarly, in some arrangements, a signal may be provided to the node scaling circuit that directs the node scaling circuit to decrease the number of compute nodes to proactively address predicted changes in demand on the application (e.g., to reduce or de-allocate resources when predicted demand is low).

In some arrangements, the application environment includes a first cluster and a second cluster, each of the first cluster and the second cluster providing computing resources. Additionally, prior to adjusting, the first cluster is allocated to the application and the second cluster is not allocated to the application. Furthermore, adjusting the first deployment of resources within the application environment to form the second deployment of resources within the application environment includes allocating the second cluster to the application.

In some arrangements, the application environment further includes a load balancing circuit. Additionally, prior to allocating the second cluster to the application, the load balancing circuit sends traffic for the application to the first cluster and does not send traffic for the application to the second cluster. Furthermore, allocating the second cluster to the application includes setting up the second cluster to process at least some traffic for the application from the load balancing circuit.

In some arrangements, generating the set of resource deployment changes includes creating the set of resource deployment changes based on network traffic conditions, numbers of connections from sources to destinations, latency, throughput, server loads, QoS metrics, and resource deployment costs of the application environment. Other metrics and various combinations of the above-identified metrics, etc. are suitable for use as well.

In some arrangements, the application environment includes a plurality of clusters, each cluster of the plurality of clusters providing computing resources on compute nodes in response to control from a cluster control circuit. Additionally, adjusting includes sending a set of commands from a workload placement engine to a set of cluster control circuits of a set of clusters of the plurality of clusters to change the first deployment of resources within the application environment to the second deployment of resources within the application environment.

In some arrangements, the application environment includes a plurality of clusters, each cluster of the plurality of clusters providing computing resources on compute nodes in response to control from a container orchestration system. Additionally, adjusting includes sending a set of commands from a workload placement engine to a set of container orchestration systems of a set of clusters of the plurality of clusters to change the first deployment of resources within the application environment to the second deployment of resources within the application environment.

In some arrangements, the application environment includes a set of application slice operators that controls a set of application slices deployed within the application environment. Additionally, adjusting includes sending a set of commands from a workload placement engine to the set of application slice operators to change the first deployment of resources within the application environment to the second deployment of resources within the application environment.

In some arrangements, the application environment includes a plurality of clusters, each cluster of the plurality of clusters providing computing resources that are virtualized into containers which are arranged into pods. Additionally, providing the second placement of workloads of the application in the second deployment of resources includes placing a workload of the application in a new pod.

In some arrangements, the application environment includes a plurality of clusters, each cluster of the plurality of clusters providing computing resources that are virtualized into containers which are arranged into pods. Additionally, providing the second placement of workloads of the application in the second deployment of resources includes placing a workload of the application in a virtual machine residing in a new pod.

In some arrangements, the application environment includes a plurality of clusters, each cluster of the plurality of clusters providing computing resources on compute nodes. Additionally, providing the second placement of workloads of the application in the second deployment of resources includes placing, as a workload of the application, a virtual machine on a compute node.

In some arrangements, the application environment includes a workload placement engine constructed and arranged to generate resource deployment changes. Additionally, generating the set of resource deployment changes includes operating the workload placement engine to generate the set of resource deployment changes based on application environment state information from the application environment.

In some arrangements, operating the workload placement engine includes running the workload placement engine on a central server within the application environment.

In some arrangements, the application environment further includes a plurality of clusters, each cluster of the plurality of clusters providing computing resources on compute nodes. Additionally, operating the workload placement engine includes running the workload placement engine in a distributed configuration among clusters of the plurality of clusters of the application environment.

In some arrangements, the application environment further includes a plurality of clusters, each cluster of the plurality of clusters providing computing resources on compute nodes. Additionally, adjusting the first deployment of resources within the application environment to form a second deployment of resources within the application environment includes providing communications from the workload placement engine to the plurality of clusters of the application environment through an overlay network to provide network traffic isolation.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in controlling placement of workloads of an application within an application environment.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 2 is a block diagram of certain load balancing features in accordance with certain embodiments.

FIG. 13(B) is a flowchart of a procedure which includes activities that enable workload placement for applications within a slice environment in accordance with certain embodiments.

DETAILED DESCRIPTION

An improved technique is directed to controlling placement of workloads of an application within an application environment by predicting a future change in demand on the application. Such predicting enables proactive scaling of resources within the application environment ahead of an actual change in demand thus efficiently applying resources and avoiding fault events (e.g., non-compliance). With such an improved technique, the application environment is able to provide more efficient and effective performance (e.g., improved traffic flow, lower latency, higher throughput, optimized connections, better balanced server loads, cost effectiveness, fault avoidance, combinations thereof, etc.). Moreover, such a technique is able to improve application performance in an automated manner thus avoiding drawbacks such as ineffective and wasteful overprovisioning and/or situations of having to react to encountered degraded/fault conditions.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

Figure 1:
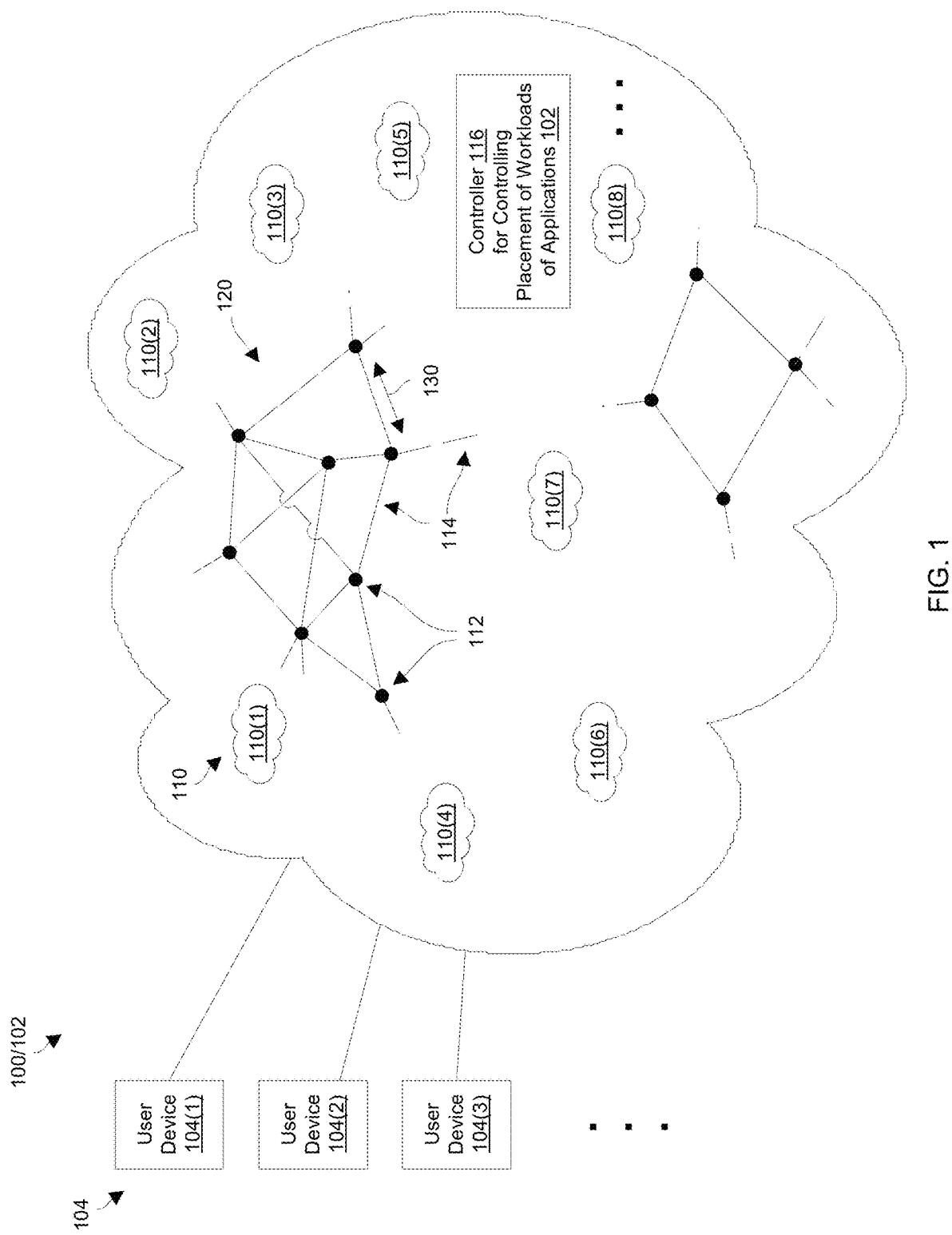
FIG. 1 is a block diagram of an application environment that controls placement of workloads in accordance with certain embodiments.

FIG. 1 is a block diagram of an application environment 100 that controls placement of workloads of an application in accordance with certain embodiments. Such an application environment 100 is suitable for supporting operation of various applications 102 such as applications that use a microservices architecture, monolithic applications, combinations thereof, etc. Such applications 102 may use TCP, UDP and/or HTTP network protocols over the application environment 100 (e.g., an application network). Along these lines, the application environment 100 provides for improved traffic flow, lower latency, higher throughput, optimized connections, better balanced server loads, satisfying particular quality of service (QoS) objectives, combinations thereof, and so on.

As shown in FIG. 1, user devices 104(1), 104(2), 104(3), . . . (collectively, user devices 104) connect to the application environment 100 to utilize services provided by an application 102. Such user devices 104 may be any apparatus capable of performing useful work while utilizing services from the application 102. With the application environment 100 controlling placement of workloads of the application 102, there is overall higher throughput and lower latency at the user devices 104 which in turn may improve the user experience.

The application environment 100 includes clusters 110, nodes 112, links 114, and a controller 116. At least a portion 120 of the application environment 100 is illustrated as a network fabric to indicate that the application environment 100 is capable of having a variety of different topologies including backbone, hub-and-spoke, loop, irregular, combinations thereof, and so on.

The clusters 110 provide different application services to support operation of one or more applications 102 utilized by the user devices 104. As will be explained in further detail shortly, such clusters 110 provide services (e.g., traditional application services, microservices, hybrid services, combinations thereof, etc.) and may include multiple components that provide the same service.

It should be understood that a first cluster 110(1) providing a first application service may request a second application service from a second cluster 110(2). Likewise, the second cluster 110(2) may request a third application service from a third cluster 110(3), and so on. Moreover, although FIG. 1 depicts the application environment 100 as including clusters 110(1), 110(2), 110(3), 110(4), 110(5), 110(6), 110(7), 110(8), . . . , it should be understood that the application environment 100 may include hundreds or even thousands of clusters 110 such as in the context of an application 102 that uses a microservices architecture.

The nodes 112 are constructed and arranged to facilitate and/or monitor operation of the application environment 110. To this end, the nodes 112 may operate as enforcement points that impose policies that influence application behavior and/or performance, and/or monitoring points to sense application environment metrics that identify how the application environment 110 is currently operating. Suitable metrics include network traffic conditions, numbers of connections from sources to destinations, latency, throughput, server loads, QoS metrics, as well as various other parameters.

The links 114 of the application environment 100 may include copper-based data communications devices and cabling, fiber optic devices and cabling, wireless devices, combinations thereof, and so on. Such links 114 connect the nodes 112 together to enable the nodes 112 to exchange various electronic signals 130 (e.g., see the double arrow 130) such as service requests from the user devices 104 and/or service requests from the clusters 110.

The controller 116 receives the application environment metrics from various nodes 112 and, based on the application environment metrics, generates sets of resource deployment changes that accommodate predicted changes in demand on one or more applications 102. Such resource deployment changes may then be effectuated among the various components of the application environment 100 such as within one or more clusters 110, at one or more nodes 112, etc. Along these lines, the controller 116 may periodically predict upcoming changes in demands on the applications 102 and proactively provide new deployments of resources within the application environment 100 based on a repository of monitored application environment metrics. Such proactive operation may continue automatically and transparently to the user devices 104 to support new placements of workloads of the applications 102. Accordingly, the application environment 100 is able to enjoy healthy application operation and avoid application degradation/fault situations.

In accordance with certain embodiments, the controller 116 is capable of analyzing hundreds or even thousands of metrics when predicting a change in demand on an application 102. In some instances, the change in demand may not warrant any modification to resource deployment while, in other instances, the controller 116 determines that such modification is warranted and executes the resource deployment adjustment.

In some embodiments, the controller 116 inputs new metrics after a resource deployment adjustment is made and then decides whether to make a further resource deployment adjustment. Accordingly, such embodiments enjoy the advantages of a feedback system which self-adjusts over time.

It should be understood that the controller 116 may reside anywhere within the application environment 100. In some arrangements, the controller 116 runs on dedicated equipment (e.g., a datacenter, a dedicated platform or server, a virtualization platform, etc.). In other arrangements, the controller 116 runs on one or more of the earlier-mentioned components of the application environment 100 (e.g., one or more user devices 104, one or more nodes 112, in a distributed manner, combinations thereof, etc.). Other locations are suitable for use as well (e.g., in one or more clusters, in the cloud, etc.).

It should be appreciated that conventional resource provisioning schemes do not (or poorly) take into account a wide variety of parameters such as time varying network conditions, compute resource availability, cost of hosting, etc. Along these lines, the workflows to configure and set up application microservices of an application, and the workflows to monitor demands for the application and compliance with QoS objectives for optimal application performance do not exist today.

In contrast to conventional resource provisioning schemes, certain embodiments are directed to predicting changes in demands on an application 102 and proactively accommodating such changes by adjusting resource deployments within the application environment 100 and placing workloads of the application 102 within the adjusted resource deployments. Here, the application 102 may be viewed as a group of workloads, and a workload may be viewed as a microservice and/or application code deployed/operating at a location within the application environment 100.

Such adjusting (or scaling) of compute resources may be performed at a variety of locations within the application environment 100. For example, at one or more nodes 112 within the application environment 100, traffic for the application 102 may be load balanced among the clusters 110 to optimize operation of the application 102. Additionally, cluster resources such as compute nodes may be scaled by increasing/decreasing the compute nodes that are allocated to the application 102. Furthermore, compute node resources such as pods (e.g., collections of containers on the compute nodes) may be scaled by increasing/decreasing the number of pods that are allocated to the application 102, and so on.

In accordance with certain embodiments, an application 102 may be viewed as a group of workloads (e.g., microservices and/or code deployed at a location). Accordingly, efficient and effective proactive provisioning of resources such as an appropriate number of clusters at appropriate locations, an appropriate number of compute nodes within the clusters, and an appropriate number of pods on the compute nodes results in healthy performance (e.g., improved traffic flow, lower latency, higher throughput, optimized connections, better balanced server loads, cost effectiveness, fault avoidance, combinations thereof, etc.). Moreover, such proactive provisioning avoids drawbacks such as ineffective and wasteful overprovisioning and/or situations of having to react to encountered degraded/fault conditions.

Load Balancing

FIG. 2 shows a view 200 of load balancing adjustment details carried out by a load balancer 202 in accordance with certain embodiments. Such a load balancer 202 serves as one or more components of the application environment 100 (e.g., see the nodes 112 in FIG. 1).

The load balancer 202 is disposed between a request source 204 and multiple clusters 110(A), 110(B) (also see the clusters 110 in FIG. 1). For simplicity, only two clusters 110 are shown but it should be understood that the load balancer 202 is capable of load balancing traffic among any number of clusters 110 (e.g., three, four, five, etc.). A suitable request source 204 may be one of the user devices 104 or another component of the application environment 100 such as a service running on one of the clusters 110 (FIG. 1). It should be understood that the term "service" refers to a service in the traditional sense for a monolithic application or a microservice for an application that uses a microservices architecture.

The load balancer 202 processes service requests 210 from the request source 204 by forwarding the service requests 210 to the clusters 110 in accordance with a currently imposed load balancing scheme. Accordingly, the request source 204 is considered downstream and the clusters 110 are considered upstream. That is, the service requests 210 are passed from the request source 204 upstream to the clusters 110, and the services 212 in response to the requests 210 flow downstream from the clusters 110 back to the request source 204. Suitable load balancing schemes for the load balancer 202 include round robin, weighted round robin, random, choosing the least loaded cluster 110, and choosing the cluster 110 with the least traffic, among others.

As further shown in FIG. 2, the load balancer 202 receives control input 220 from the controller 116 for controlling operation of workloads of applications 102 (also see FIG. 1). As will be explained in further detail shortly, such control input 220 (e.g., commands, instructions, control messages, etc.) from the controller 116 is based on application environment metrics 230 received from the application environment 100. Accordingly and in contrast to static load balancing, the load balancer 202 is able to modify how the requests 210 are load balanced among the clusters 110 (i.e., change operation) in response to changes within the application environment 100 over time. Such modification may involve changing from one type of load balancing scheme to another (e.g., from round robin to random), replacing an existing set of load balancing weights used by the load balancer 202 with a new set of load balancing weights, redirecting the traffic to accommodate migration of a set of workloads in one cluster 110 to another set of workloads in another cluster 110, combinations thereof, and so on.

For example, suppose that the load balancer 202 is currently applying weighted load balancing in accordance with a 50/50 load balancing configuration where 50% of the service requests 210 are sent to cluster 110(A) and the remaining 50% of the service requests 210 are sent to the cluster 110(B). This 50/50 load balancing configuration may initially work well, but become sub-optimal over time due to changes within the application environment 100 such as changes in user device behavior (e.g., increased service demand), changes within the network fabric (e.g., a failed link 114), changes in cluster capacity (e.g., a reduction in throughput at a particular cluster 110), other changes, combinations thereof, etc.

It should be understood that the controller 116 is able to detect such changes by analyzing the application environment metrics 230. As will be explained in further detail shortly and in accordance with certain embodiments, the controller 116 may input such metrics 230 into a policy engine or model which, in turn, outputs a new load balancing configuration. Moreover, in accordance with certain embodiments, the policy engine or model may be updated periodically (e.g., by a human administrator, algorithmically, via machine learning, via reinforced learning, combinations thereof, etc.) to provide optimized load balancing configurations over time.

In the above-described example, suppose that the policy engine generates a new load balancing configuration in response to recent application environment metrics 230. In particular, suppose that the new load balancing configuration is an 80/20 load balancing configuration where 80% of the service requests 210 should now be sent to cluster 110(A) and the remaining 20% of the service requests 210 should now be sent to the cluster 110(B).

Following generation of the new 80/20 load balancing configuration, the controller 116 deploys the new 80/20 load balancing configuration to the load balancer 202 via the control input 220. In response, the load balancer 202 replaces the prior 50/50 load balancing configuration with the new 80/20 load balancing configuration.

Such operation continues over time where the controller 116 receives new application environment metrics 230 from the application environment 100, and generates and deploys new load balancing configurations to the load balancer 202 in a self-adjusting manner. Further details will now be provided with reference to FIG. 3.

Figure 3A:
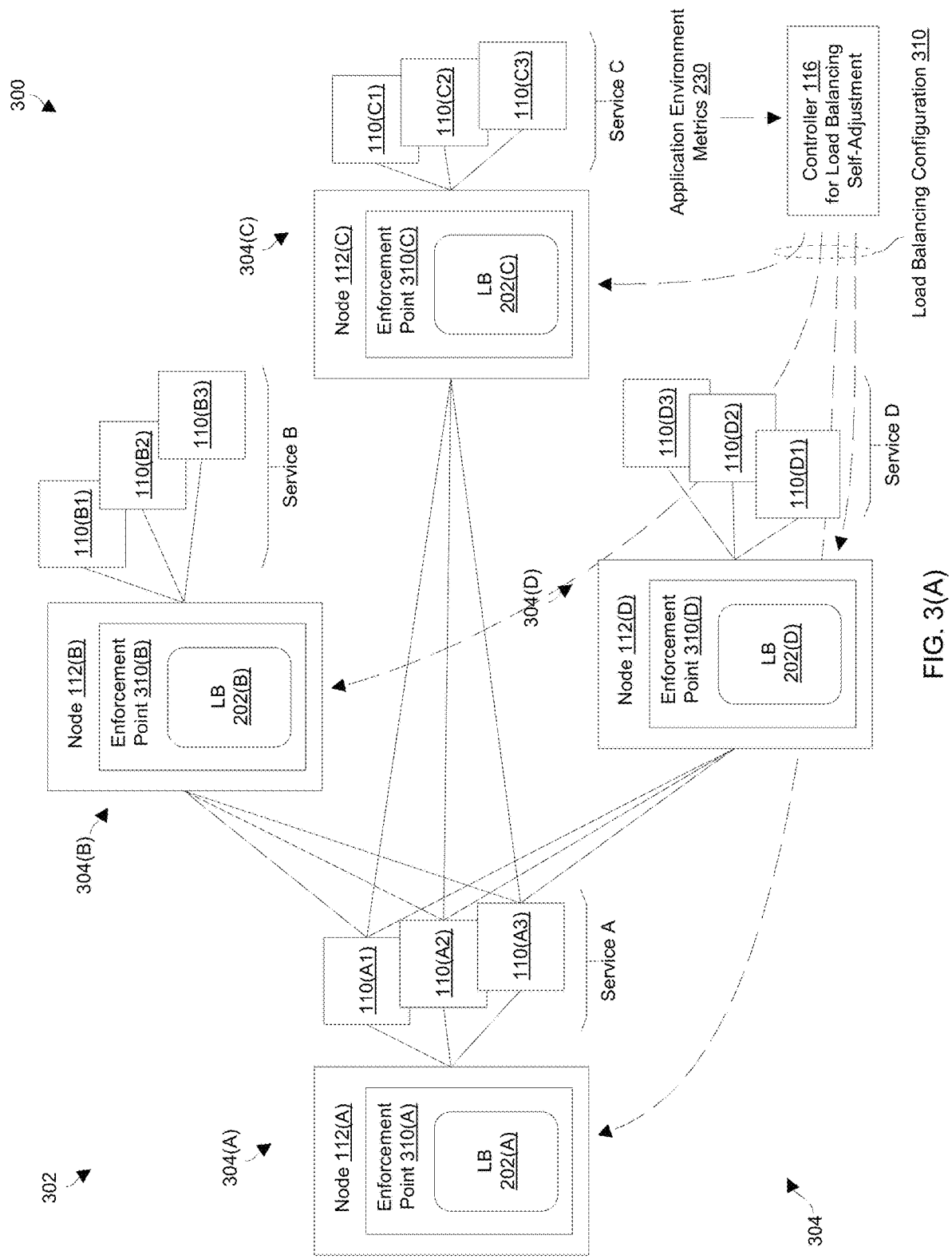
FIG. 3(A) is a block diagram of a portion of an application environment in accordance with certain embodiments.
Figure 3B:
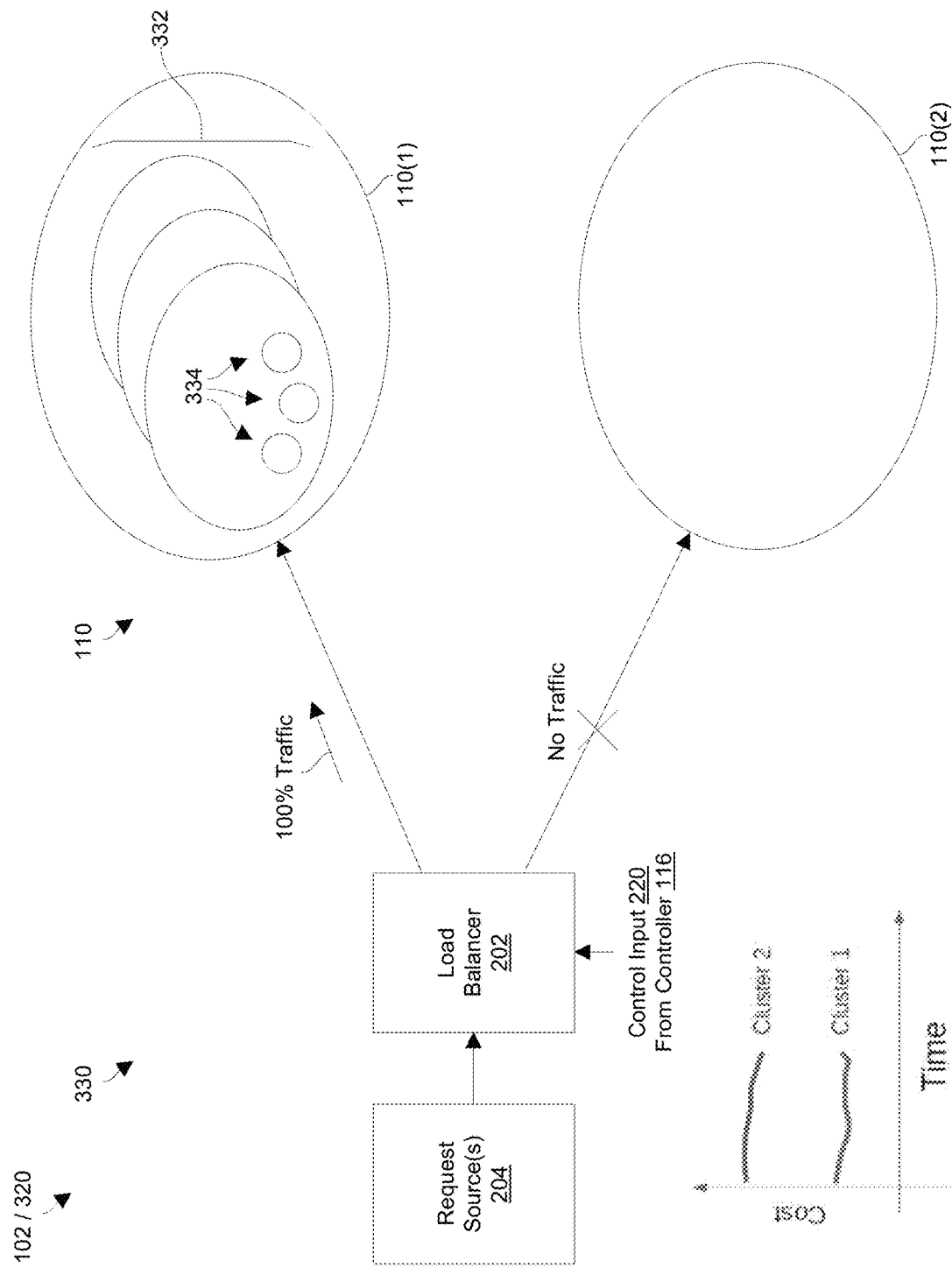
FIG. 3(B) is a block diagram of a load balancing example at a first time in accordance with certain embodiments.
Figure 3C:
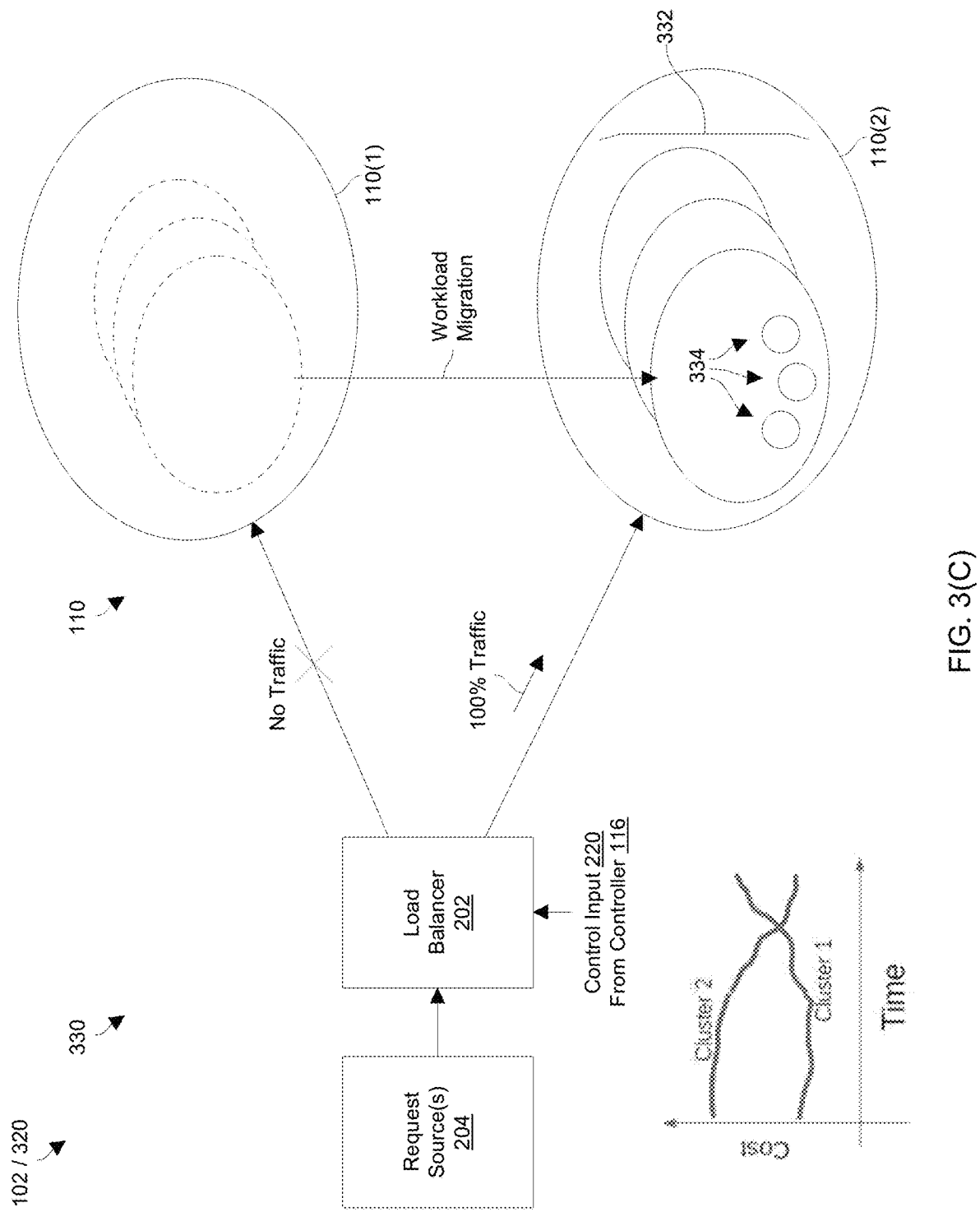
FIG. 3(C) is a block diagram of the load balancing example at a second time in accordance with certain embodiments.

FIGS. 3(A), 3(B), and 3(C) show certain details of the application environment 100 in accordance with certain embodiments. FIG. 3(A) shows an example portion of the application environment 100 in accordance with certain embodiments. FIG. 3(B) shows an initial configuration for an application 102 in accordance with certain embodiments. FIG. 3(C) shows a subsequent (or later) configuration for the application 102 in accordance with certain embodiments.

FIG. 3(A) shows a view 300 of an example portion 302 of the application environment 100. The example portion 302 may for part of a larger setting such as the application environment 100 in FIG. 1.

As shown in FIG. 3, the example portion 302 includes multiple load balancing pairings 304. Such load balancing pairings 304 include load balancers 202 and clusters 110, where the load balancers 202 load balance service requests 210 to the clusters 110 in accordance with a series of updated load balancing configurations 310 from the controller 116. As explained earlier, such load balancing configurations 310 may be generated by the controller 116 based on application environment metrics 230 obtained from the application environment 100.

In accordance with this example, the load balancing pairing 304(A) includes a load balancer 202(A) and clusters 110(A1), 110(A2), 110(A3) that provide the same service (or microservice) A (also see the services 212 in FIG. 2). Similarly, the load balancing pairing 304(B) includes a load balancer 202(B) and clusters 110(B1), 110(B2), 110(B3) that provide the same service B. Likewise, the load balancing pairing 304(C) includes a load balancer 202(C) and clusters 110(C1), 110(C2), 110(C3) that provide the same service C. Furthermore, the load balancing pairing 304(D) includes a load balancer 202(D) and clusters 110(D1), 110(D2), 110 (D3) that provide the same service D.

In some arrangements, the clusters 110(A1), 110(A2), 110(A3) may be a group of microservice clusters providing the first same microservice. Similarly, the clusters 110(B1), 110(B2), 110(B3) may be another group of microservice clusters providing the second same microservice, and so on.

It should be understood that each pairing 304 is shown as including a load balancer 202 that load balances service requests 210 to three clusters 110 by way of example only. However, each pairings 304 may include a different number of clusters (e.g., one, two, four, five, . . . ) and the load balancer 202 load balances service requests 210 to those different numbers of clusters in accordance with the series of updated load balancing configurations 310 from the controller 116.

In accordance with certain embodiments, one or more of the clusters 110 may be implemented as a server in the traditional sense. Such service clusters are well suited for supporting operation of monolithic applications operating within the application environment 100. For example, such a cluster 110 may include one or more servers formed via one or more server applications running on dedicated hardware.

Additionally, in accordance with certain embodiments, one or more of the clusters 110 may be a microservices server. Such microservice clusters are well suited for supporting operation of applications using microservices architectures. For example, such a cluster 1100 may be formed via microservice code running in a data center or in a cloud infrastructure. Amazon Web Services offered by Amazon.com, Inc. of Seattle Washington, the Google Cloud Platform offered by Alphabet Inc. of Mountain View, California, and Microsoft Cloud Services offered by Microsoft Corporation of Redmond, Washington are examples of suitable hosting platforms.

It should be understood that the load balancers 202 may reside within nodes 112 (also see FIG. 1). Along these lines, such a node 112 may serve as an enforcement point 310, and that the load balancer 202 forms part of the enforcement point 310 (i.e., to impose a current load balancing policy on service requests 210 (FIG. 2).

It should be understood that the example portion 302 illustrates a possible logical topology rather than a physical topology. Accordingly, the pathways between the various components may include a variety different communications media (e.g., copper, optical fiber, wireless, routers, switches, other type of data communications devices, combinations thereof, and so on), as well as span various distances (e.g., feet, campuses, cities, hundreds of miles, etc.).

It should be understood that the nodes 112 that provide a service can be traversed via multiple intermediate nodes 112 from the load balancer to those nodes 112. Furthermore, the application environment metrics can include state information from all these intermediate nodes 112 and their connecting links 114 (or paths). Such may be the situation when endpoints and services are connected to the load balancer via intermediate nodes 112 (e.g., multi-hop).

FIG. 3(B) shows a view of an initial configuration 320 for an application 102 in deployment within the application environment 100 (also see FIG. 1). As explained above, the application environment 100 includes a variety of resources such as clusters 110, compute nodes 332 within the clusters 110, and pods 334 within the compute nodes 332. Along these lines, the cluster 110(1) may reside in a first region (e.g., Region 1), and the cluster 110(2) may reside in a second region (e.g., Region 2).

For the initial configuration 320, the application 102 has been allocated the cluster 110(1), but not the cluster 110(2). Within the cluster 110(1), the application 102 has been allocated multiple compute nodes 332, and pods 334 within the compute nodes 332.

During operation of the initial configuration 320, the load balancer 202 processes requests from one or more request sources 204 (also see FIG. 2). Along these lines, in response to control input 220 from the controller 116, the load balancer 202 applies a particular load balancing configuration (e.g., a load balancing scheme, weights, combinations thereof, etc.) to load balance traffic. By way of example, the load balancer 202 directs 100% of the traffic to the cluster 110(1) and no traffic to the cluster 110(2) in accordance with the particular load balancing configuration.

In this example, the controller 116 may have determined (perhaps based on additional metrics) that the cost of resources in the cluster 110(1) is less than the cost of resources in the cluster 110(2) (e.g., see the inserted graphical input). In other examples, other criteria may be behind the determination, e.g., resource availability, latency, network bandwidth, combinations thereof, etc.

FIG. 3(C) shows a view of a later configuration 340 for the application 102 in deployment within the application environment 100. Here, the application 102 has been allocated the cluster 110(2), but not the cluster 110(1). Within the cluster 110(2), the application 102 has been allocated multiple compute nodes 332, and pods 334 within the compute nodes 332.

To achieve this later configuration 340, the controller 116 (FIGS. 1 and 2) communicates with the clusters 110 as well as the load balancer 202. Along these lines, the controller 116 removes the cluster 110(1) endpoint and adds the cluster 110(2) endpoint in the load balancer configuration. The controller 116 also configures certain operating parameters on the clusters 110 to accommodate the load change such as enabling certain features/operations/etc. on the cluster 110 (2) for effective workload migration 350 between the clusters 110.

For this later configuration 340, the controller 116 may have determined that the cost of resources in the cluster 110(1) is now greater than the cost of resources in cluster 110(2) (e.g., see the newly inserted graphical input). Again, in other examples, other criteria may be behind the determination, e.g., resource availability, latency, network bandwidth, combinations thereof, etc.

During operation of the later configuration 340, the load balancer 202 processes requests from one or more request sources 204 by applying the new load balancing configuration from the controller 116. Accordingly, the load balancer 202 now directs 100% of the traffic to the cluster 110(2) and no traffic to the cluster 110(1) in accordance with the new load balancing configuration.

Load balancing that is similar to that described above is disclosed in U.S. application Ser. No. 17/393,960, filed on Aug. 4, 2021, entitled "Performing Load Balancing Self Adjustment within an Application Environment", the contents and teachings of which are hereby incorporated by reference in their entirety.

Cluster Node Scaling

Figure 4A:
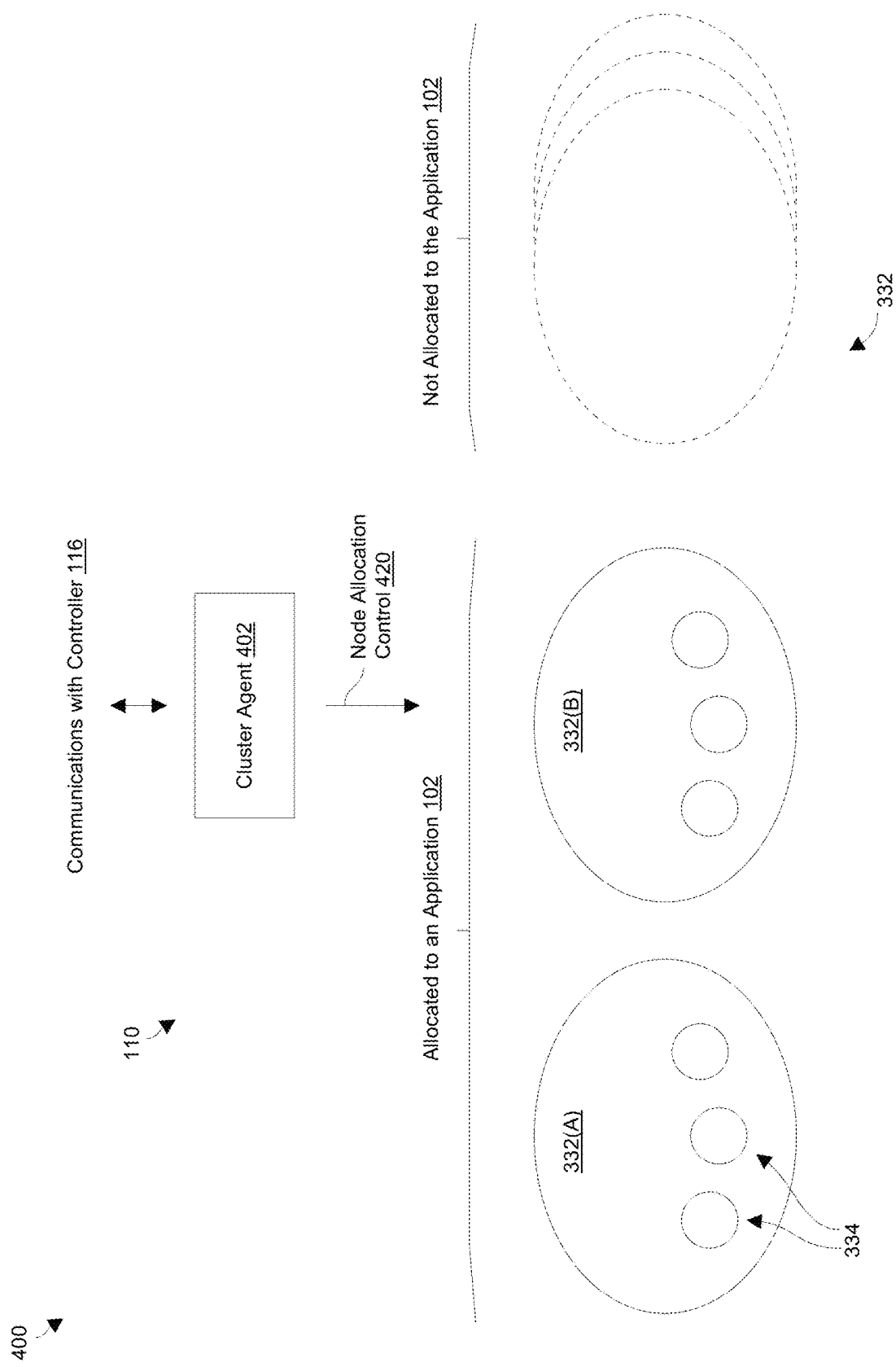
FIG. 4(A) is a block diagram of a node scaling example at a first time in accordance with certain embodiments.
Figure 4B:
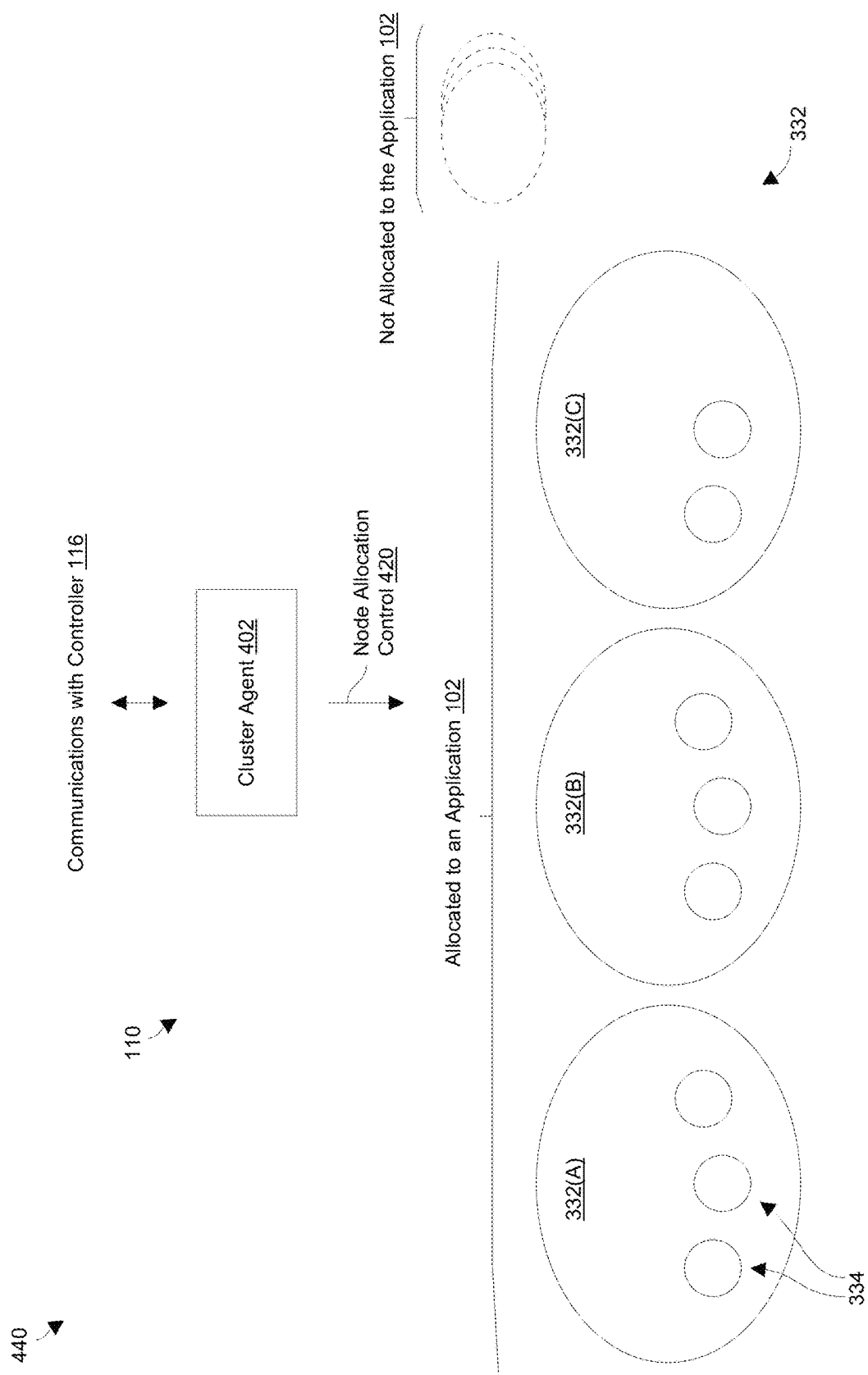
FIG. 4(B) is a block diagram of the node scaling example at a second time in accordance with certain embodiments.

FIGS. 4(A) and 4(B) illustrate certain node autoscaling details in accordance with certain embodiments. FIG. 4(A) shows an initial node allocation situation 400 for a cluster 110 in accordance with certain embodiments. FIG. 4(B) shows a subsequent node allocation situation 440 for the cluster 110 in accordance with certain embodiments.

As shown in Fig. (A), the node allocation situation 400 for the cluster 110 includes a cluster agent 402 and compute nodes 332 (also see FIGS. 3(B) and 3(C)). At least a portion of the cluster agent 402 is constructed and arranged to serve as a compute node scaling circuitry by allocating compute nodes 332 to and deallocating compute nodes 332 from one or more applications 102 within the application environment 100 (also see FIG. 1). This scaling feature is illustrated by the node allocation control arrow 420.

The compute nodes 332 include compute resources such as CPU, memory, etc. to support workloads of applications 102. However, it should be understood that the compute nodes 332 have capacity limits. Accordingly, the cluster agent 402 is constructed and arranged to perform compute node autoscaling to ensure that the number of pods 334 residing on each compute node 332 does not exceed a predefined pod capacity threshold to avoid any workload performance degradation.

By way of example, the cluster agent 402 has already allocated compute nodes 332(A) and 332(B) to an application 102. Along these lines, each of the compute nodes 332(A), 332(B) currently hosts a respective set of pods 334. As mentioned earlier, a pod 334 is a set of containers that supports operation of a workload (or workload instance) of the application 102.

Now, suppose that the controller 116 predicts an increase in demand on the application 102 and instructs the cluster agent 402 to allocate two more pods 334 to the application. Further suppose that the predefined pod capacity threshold for the compute nodes 332 of the cluster 110 is three pods 334. Accordingly, each of the compute nodes 332(A), 332(B) is already at full capacity.

As shown in FIG. 4(B) and in response to the input from the controller 116, the cluster agent 402 allocates another compute node 332(C) to the application 102. Accordingly, there is now capacity to support the two additional pods 334 as instructed by the controller 116. In accordance with certain embodiments, the cluster agent 402 may allocate a compute node 332 from a pool of available (or unused) compute nodes 332 (e.g., see the non-allocated compute nodes 332 in FIGS. 4(A) and 4(B)). However, in other embodiments, the cluster agent 402 may allocate a compute node 332 that is being shared with another application 102.

In some arrangements, the controller 116 manages the number of compute nodes 332 that are allocated to the application 102. In other arrangements, the controller 116 manages the number of pods 334 that are allocated to the application 102 and relies on the cluster agent 402 to correctly allocate an appropriate number of compute nodes 332 to support that number of pods 334 (e.g., three compute nodes 332 to support eight pods 334 when the predefined pod capacity threshold is three).

It should be understood that the cluster agent 402 is able to decrease (or scale down) the number of compute nodes 332 in the same manner that the cluster agent 402 increases the number of compute nodes 332. For example, controller 116 may inform the cluster agent 402 to reduce the number of compute nodes 332 or the number of pods 332, and the cluster agent 402 responds accordingly.

In accordance with certain embodiments, proactive autoscaling is combined with reactive autoscaling when controlling the number of compute nodes 332. For example, proactive autoscaling may be used to increase the number of compute nodes 332 to address predicted increases in demands on the application. However, reactive autoscaling may be used to reduce the number of compute nodes 332 to ensure that there are enough resources allocated to address actual demands on the application when the actual demands are greater than the predicted decreases in demands on the application.

One should appreciate that the cost of consuming resources from the cluster 110 may be at compute node granularity. That is, the cost is based on the number of compute nodes 332 allocated to the application 102. In such a situation, the controller 116 may make decisions as to which cluster(s) 110 and how many compute nodes 332 to allocate from the cluster(s) 110 based on compute node costs.

Pod Scaling

Figure 5:
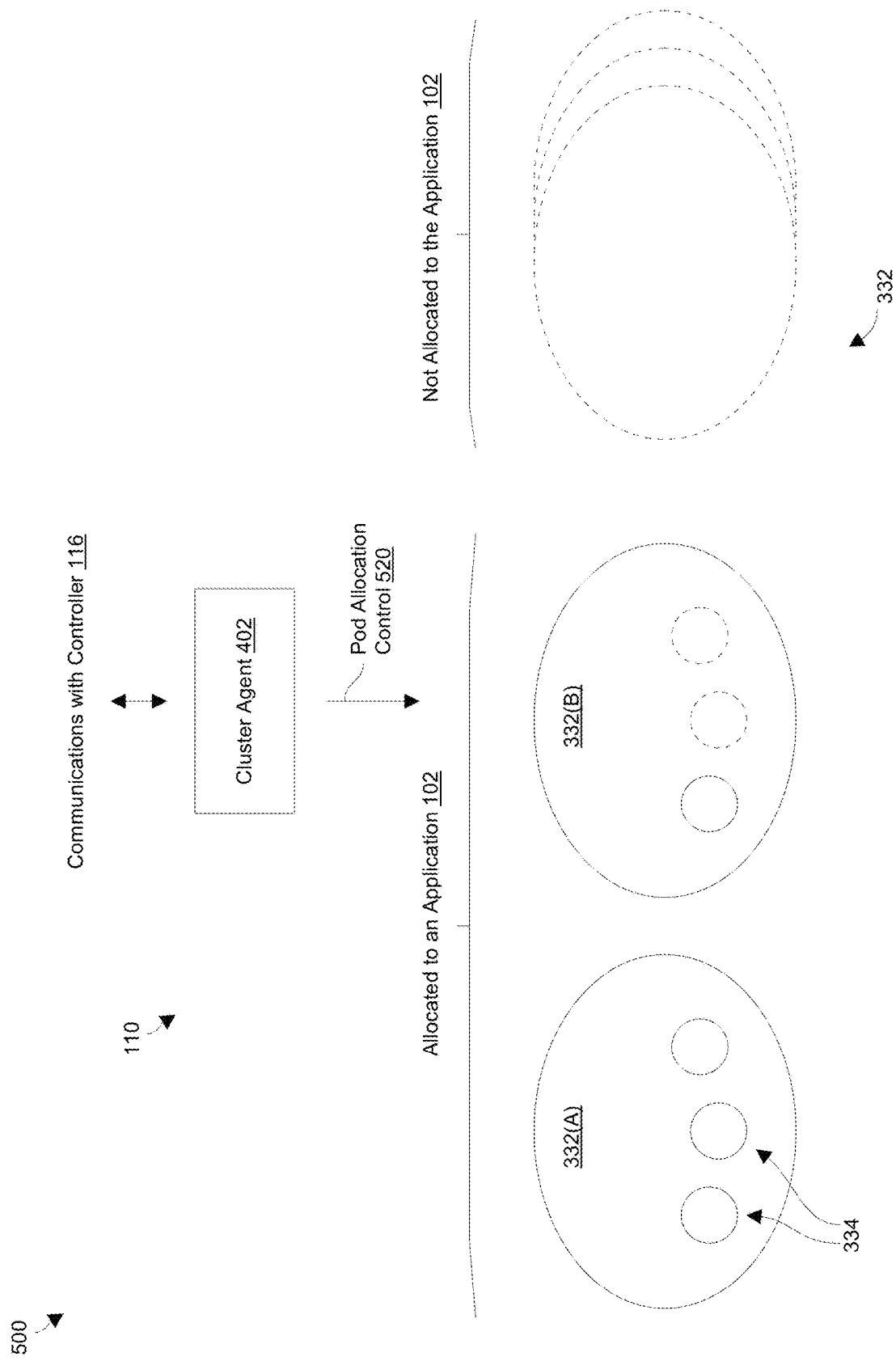
FIG. 5 is a block diagram of a pod scaling example in accordance with certain embodiments.

FIG. 5 illustrates certain pod autoscaling details in accordance with certain embodiments. As shown in FIG. 5, a resource situation 500 for the cluster 110 includes a cluster agent 402 and compute nodes 332 (also see FIGS. 4(A) and 4(B)). The cluster agent 402 is constructed and arranged to allocate pods 334 to and deallocate pods 334 from one or more applications 102 within the application environment 100 (also see FIG. 1). This scaling feature is illustrated by the pod allocation control arrow 520.

As mentioned earlier, the compute nodes 332 include compute resources such as CPU, memory, etc. to support workloads of applications 102, and the computer nodes 332 have capacity limits. Accordingly, at least a portion of the cluster agent 402 is constructed and arranged to serve as a pod scaling circuit that performs pod autoscaling to ensure that the number of pods 334 residing on the cluster 110 satisfies the resource needs set forth by the controller 116. Moreover, the cluster agent 402 ensures that each compute node 332 does not exceed a predefined pod capacity threshold to avoid any workload performance degradation.

By way of example, the cluster agent 402 has already allocated compute nodes 332(A) and 332(B) to an application 102, and four pods on the allocated compute nodes 332(A) and 332(B). Specifically, there are three pods 334 on the compute node 332(A) and one pod on the compute node 332(B). In view of the predefined pod capacity threshold of a maximum of three pods 334 on a compute node 332, the compute node 332(B) has capacity for two more pods 334 (shown in phantom in FIG. 5).

During operation, the cluster agent 402 is able to increase or decrease the number of pods 334 on the cluster 110. To increase the number of pods 334, the cluster agent 402 adds (or allocates) pods 334 to an allocated compute node 332 provided that the allocated compute node 332 has capacity. Otherwise, the cluster agent 402 also increases the number of compute nodes 334 (e.g., allocates one or more compute nodes 334) to properly support the number of pods 334.

Similarly, to decrease the number of pods 334, the cluster agent 402 removes (or deallocates) pods 334 from the cluster 110.

In some arrangements, the cluster agent 402 attempts to remove pods 334 from the compute node 332 having the fewest pods 334. Such process minimizes costs incurred by the application 102 are at compute node granularity.

In accordance with certain embodiments, proactive autoscaling is combined with reactive autoscaling when controlling the number of pods 334. For example, proactive autoscaling may be used to increase the number of pods 334 to address predicted increases in demands on the application. However, reactive autoscaling may be used to reduce the number of pods 334 to ensure that there are enough resources allocated to address actual demands on the application when the actual demands are greater than the predicted decreases in demands on the application.

Control Provided to a Workload Management Package

As explained thus far, the control provided by the controller 116 may be provided to various components within the application environment 100 such as a load balancer 202 (e.g., FIGS. 2 and 3(A) through 3(C)) and/or a cluster agent 402 (e.g., FIGS. 4(A), 4(B), and 5). In accordance with other embodiments, the controller 116 provides input other components within the application environment 100. Accordingly, the controller 116 is able to control deployment of resources of the application environment 100 for one or more applications 102 at a variety of levels (e.g., load balancing, node allocation, pod allocation, CPU and memory provisioning, and so on).

In some embodiments, the controller 116 provides input to a workload management package (or platform) of the application environment 100 (FIG. 1). Such a workload management package may provide an application programming interface that enables the controller 116 to provide high level direction regarding resource allocation/deployment and rely on the workload management package to handle the lower level resource deployment details (e.g., load balancing based on a specified policy or weights, horizontal and/or vertical node/pod allocation, combinations thereof, and so on). Although such a workload management package may operate within the application environment 100, the workload management package may be considered external to certain embodiments in that such embodiments merely communicate with (e.g., receive information from and/or provide control to) the workload management package.

It should be understood that there are a variety of workload management packages that are suitable for use. Examples include but are not limited to AWS and/or its lower level services, Azure and/or its lower level services, Kubernetes, combinations thereof, and the like.

Control Provided to an Application Slice

In some embodiments, the controller 116 provides control to a specialized construct within the application environment 100 which is referred to as an "application slice." In general, the application slice construct can be used across distinct clusters C to ease the deployment and management of services (specifically, to provide an application-oriented view and organization as opposed to the more structural pod/cluster view and organization, which can have drawbacks as mentioned below). In some embodiments, as described in examples herein, an application slice can include a respective overlay network that provides several communications related functionalities. More generally, an application slice may minimally include application namespace bindings to the slice and associated resource quota management and namespace-based isolation. Application slices can also be used in conjunction with multi-tenancy as described further below.

In accordance with certain embodiments, the application environment 100 includes a platform that enables creating multiple logical application slices in a single cluster or group of clusters regardless of their physical location. Existing intra-cluster communication can remain local to the cluster utilizing the CNI interface. Application slice provides isolation of network traffic between clusters by creating an overlay network for inter-cluster communication. Clusters are interconnected using secure gateways (VPN/IPSEC/L2TP/etc.). One or more clusters may be attached to the slice. Each slice has its own separate L3 domain address space—separate Subnet. Each cluster that is part of the slice has a part of the slice-subnet. Application Pods are connected to a slice and can connect to each other on Slice Subnet creating an overlay L3 network using Slice Routers across the slice. The overlay L3 network is collection of vWires, and the connectivity is driven by the network service names (namespace-driven) associating workloads/applications to a slice. Applications/Pods that are attached to slice have an IP interface to the slice specific L3 address space. Each slice may include a global namespace that is normalized across the slice—in all the clusters that are attached to slice. All the services that are attached to the slice (across one or more clusters) are visible to each other via slice wide service discovery. Exporting services from one attached cluster in the slice to all the clusters that are attached to the slice. Exported services are only visible to the applications/services attached to the slice.

In accordance with certain embodiments, control from the controller 116 is provided to a set of slice operators of an application slice. The controller 116 then relies on the set of slice operators to effectuate deployment of resources and/or placement of workloads within the deployment.

In some embodiments, controlling placement of workloads involves providing control to an application slice, which can exhibit some or all the following:

The Mesh (also known as "Mesh" or "KubeSlice") platform combines network, application, Kubernetes, and deployment services in a framework to accelerate application deployment in a multi-cluster, multi-tenant environment. KubeSlice achieves this by creating logical application Slice boundaries that allow pods and services to communicate seamlessly across clusters, clouds, edges, and data centers. As enterprises expand application architectures to span multiple clusters located in data centers or cloud provider regions, or across cloud providers, Kubernetes clusters need the ability to fully integrate connectivity and pod-to-pod communications with namespace propagation across clusters. The Smart Application Framework makes it easier to scale and operate cloud business. It infuses intelligence and automation on top of the existing infrastructure to make application infrastructure smarter and grow efficiently while improving quality. The framework includes: (1) the Smart Application Mesh (KubeSlice/Mesh Platform); (2) the Application Slice; and (3) the Smart Applications like AIOps driven Load Balancer or workload placement.

The platform architecture consists of a number of components that interact with each other to manage the lifecycle of the slice components and its overlay network. Mesh platform enables creation of a collection of microservices and or collection of virtual machines irrespective of location be in a data center or in multi-cloud to form a domain. This domain acts as micro segmentation to the rest of the workloads. Slice has the capability of spanning across clusters and geographical boundaries. Application slice is an overlay on your existing service mesh or hybrid footprint. The platform enables zero trust security across all workloads/micro services. The system federates security for service-to-service communication. A security controller works as a typical Kubernetes-native application with Custom Resources and Controllers with no additional infrastructure or custom configuration formats.

The platform enables customers to extend compute resources to Edge. A small footprint will enable workloads to scale-out to edge compute and appear as a cloud extension to the rest of the services The system can establish Reinforcement Learning for load balancing service to service communication. RL based load balancing of service-to-service communication helps better utilization of resources and enables huge positive impact to customer experience. RL based load balancing helps to identify bottlenecks in service-to-service communication in a proactive measure.

The Smart Application Overlay works on a multi-cluster environment with Slice. In a Multi-cluster environment, service discovery, security and name space are normalized to create a surface area which has fine grain traffic control and security posture.

The Mesh provides a seamless way to manage, connect, secure, and observe applications that need to run workloads on the edge as well as public cloud.

The disclosed system addresses an opportunity that has arisen from the development of the 'Service Mesh' (like Istio™) and 'Network Service Mesh (NSM)' constructs originating from the development of Kubernetes, microservices, and other technologies under the umbrella of 'Cloud Native Computing.' These technologies have enabled multi-cloud distributed applications with Kubernetes microservices clusters deployed across multiple public clouds, edge clouds and customer premise private clouds. It is now possible to create an application overlay infrastructure that interconnects distributed application clusters/Pods across domains. These application specific overlays can now provide a tight binding between an application and its overlay network. Applications can now specify the exact connectivity and QOS requirements required for the application. This allows application developers to build and deploy application overlay networks that support application driven traffic engineering/steering with network-level QOS on the underlying infrastructure.

In accordance with certain embodiments, disclosed herein is an "Application Slice"—a key feature of the Mesh Platform. The platform allows operators to build application slices—application overlays—that are a way of grouping application pods based on one or more organizing principles such as velocity of deployment, security, governance, teams, deployment environments like production/development/pre-production, etc.

The Mesh provides mechanisms to create and manage slices—create an overlay network, apply network policy and service discovery across the slice; and continuous monitoring of slices; observe the slice telemetry, service-to-service relationships, and traffic prioritization and management.

In some embodiments, the Mesh supports combinations of the following:
  Operators that create, monitor, and manage application slice overlay networks that are specific to each set of distributed applications.
  Connecting, securing, and deploying the microservices across multiple Kubernetes clusters using application slices. A cluster to be part of multiple slices simultaneously.
  Applying Network Policies and Service Discovery across the slice, ensuring traffic isolation within their respective overlay networks while also managing traffic and its prioritization.
  Observing Slice Telemetry and service-to-service relationships.
  Provides separate independent L3 domain per slice
  Provides an ability to create multiple slices in one or more clusters
  Provides micro-segmentation in one or more clusters using application slices
  Provides a mechanism to create and manage global namespace for application slice and normalize that across the slice worker clusters
  Provides mechanism to associate namespaces to application slices and normalize that across the slice worker clusters
    Provide mechanism to associated resource quotas to application slice and associated namespaces and normalize that across the slice worker clusters
  Provides mechanism to create and apply network policies to application slice normalize that across the slice worker clusters
  Provides secure inter-domain connectivity across slice worker clusters
    Separate VPN/IPSEC/L2TP/etc. tunnels, per slice network namespace
  Namespace-driven connectivity across the slice—using network service mesh
  Provides mechanism to integrate Service Mesh(es) across the slice
  Provides mechanisms to import/export services from/to separate Service Mesh control planes across clusters
  Provides mechanism to incorporate ingress/egress gateways to scale the service deployment and discovery
  Provides declarative mechanisms for slice management
  Provides an overlay data plane (CNI agnostic) and an associate control plane to build the overlay networks
  Provides mechanisms for namespace-driven intra-domain (within a cluster) and inter-domain (across clusters) connectivity over an overlay network.

An application slice that is similar to those described above is disclosed in U.S. application Ser. No. 17/735,339, filed on May 3, 2022, entitled "Distributed Computing System with Multi Tenancy Based on Application Slices", the contents and teachings of which are hereby incorporated by reference in their entirety.

Controller Details

Figure 6:
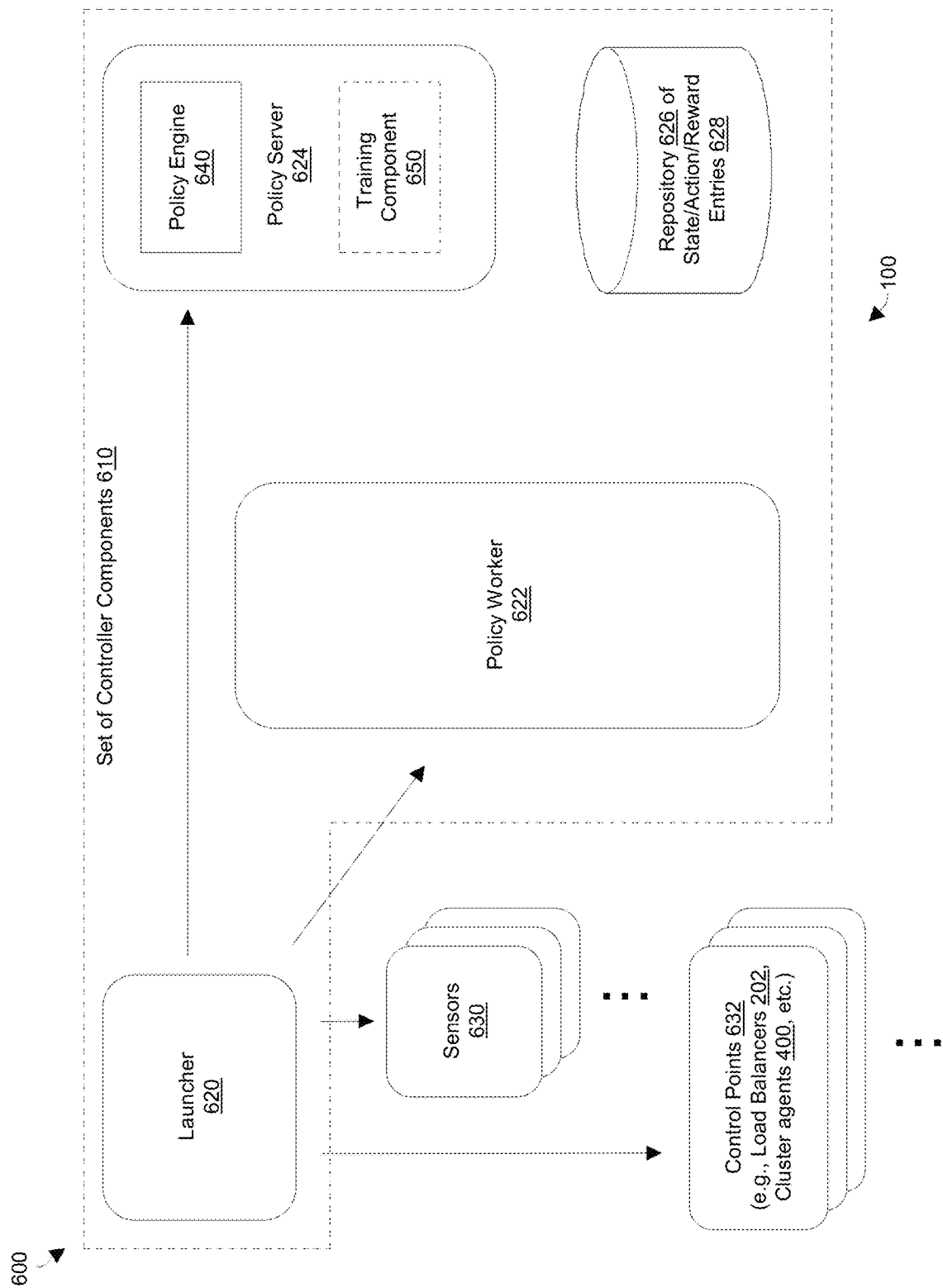
FIG. 6 is a block diagram of particular application environment components that are put into operation in accordance with certain embodiments.
Figure 7:
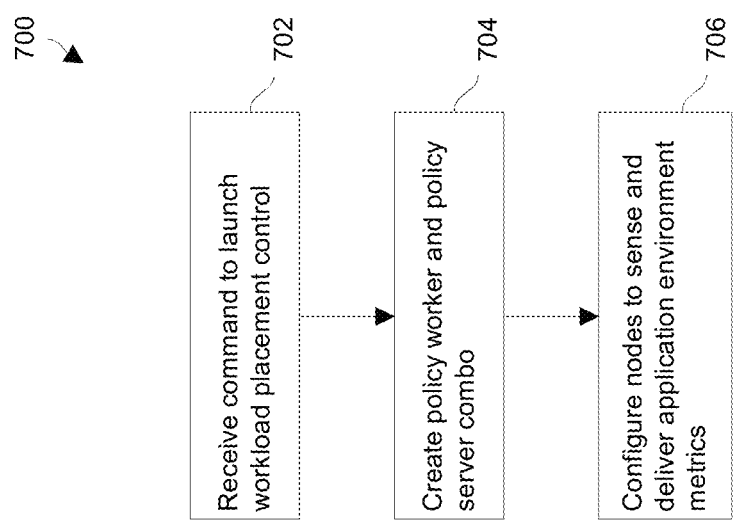
FIG. 7 is a flowchart of a procedure which is performed by a launcher in accordance with certain embodiments.
Figure 8:
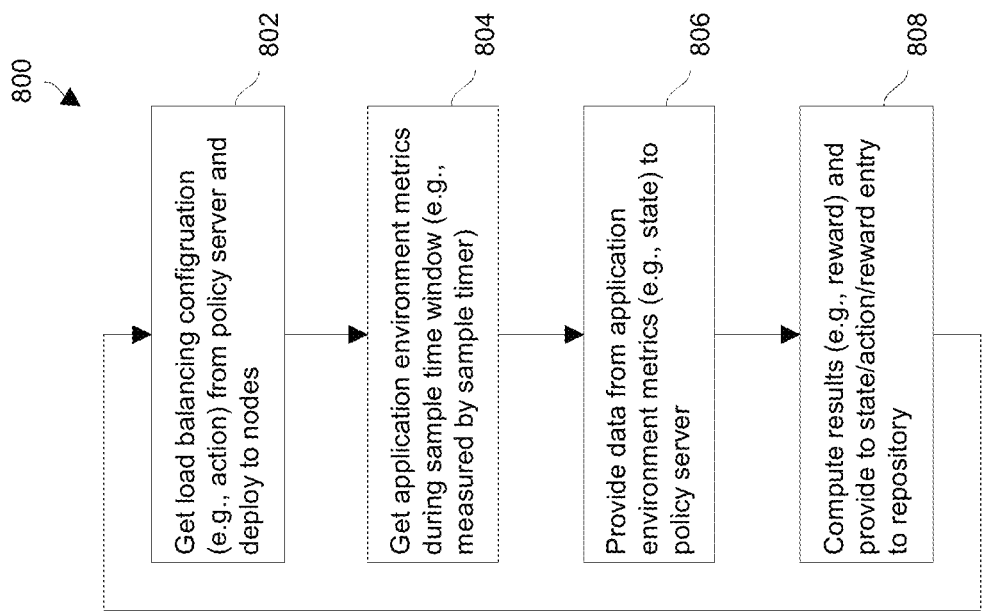
FIG. 8 is a flowchart of a procedure which is performed by a policy worker in accordance with certain embodiments.
Figure 9:
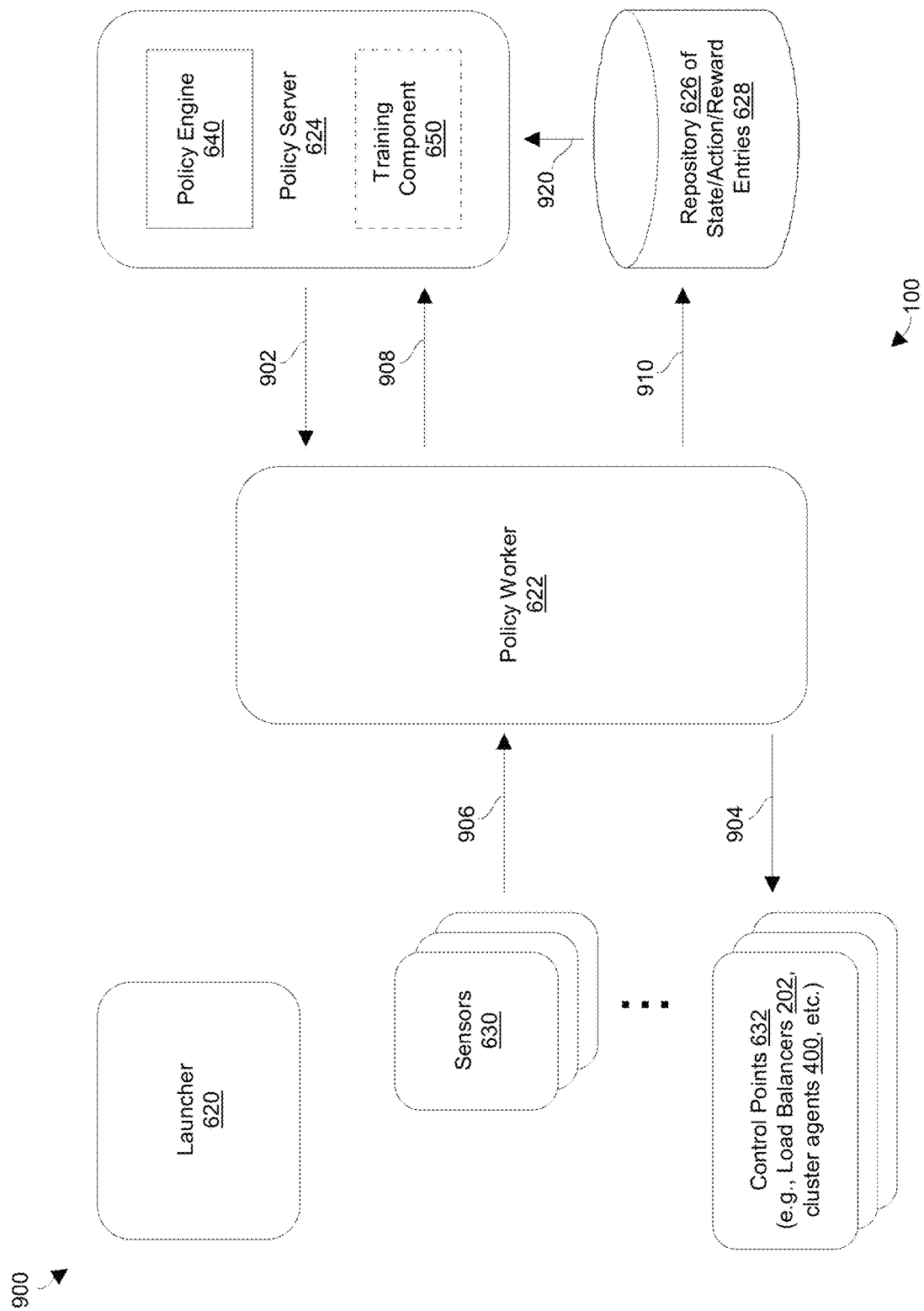
FIG. 9 is a block diagram of certain flows within the application environment in accordance with certain embodiments.
Figure 10:
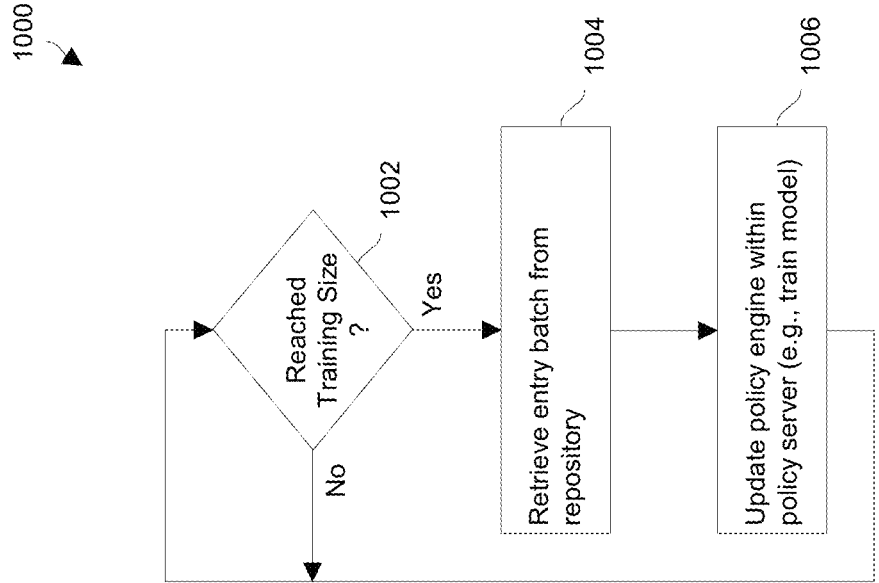
FIG. 10 shows a flowchart of a procedure which is performed by a policy server in accordance with certain embodiments.

FIGS. 6 through 10 illustrate details of how the controller 116 may be constructed in accordance with certain embodiments. FIG. 6 shows a view 600 in which particular components of an application environment 100 are put into operation. FIG. 7 shows a flowchart of a procedure 700 which is performed by a launcher of the application environment 100. FIG. 8 shows a flowchart of a procedure 800 which is performed by a policy worker of the application environment 100. FIG. 9 shows a view 900 illustrating certain flows during operation of the application environment 100. FIG. 10 shows a flowchart of a procedure 1000 which is performed by a policy server of the application environment 100.

As best seen in the view 600 of FIG. 6 and in accordance with certain embodiments, various components of the application environment 100 are involved controlling placement of workloads of an application 102 within the application environment 100. Along these lines, in contrast to the data plane where services 212 are delivered in response to service requests 210 (also see FIG. 2), particular components may reside in a control plane that controls workload placement behavior, and thus performance, of the data plane.

To this end, a set of components 610 of the controller 116 (also see FIGS. 1 and 2) includes a launcher 620, a policy worker 622, a policy server 624, and a repository 626 of state/action/reward entries 628. Such components 610 are shown to be contained within a dashed line to indicate that they form part of the controller 116, and to further illustrate that the components 610 do not necessarily need to reside at the same location. Rather, in some embodiments, one or more of the components 610 of the controller 116 may reside at a different locations (e.g., at a datacenter, remotely in different devices, distributed within the cloud, etc.).

The launcher 620 is constructed and arranged to create one or more of the other components 610 when the application environment 100 is ready for workload placement. Along these lines, the launcher 620 creates the policy worker 622 and the policy server 624 in response to a launch command.

The launcher 620 may further create the repository 626 or the repository 626 may already exist (e.g., as a template, as a database of previously stored sample data or preliminary/simulated data, etc.). As will be explained in further detail shortly, the repository 626 holds entries 628 (e.g., tuples or trajectories) of state details, action details, and reward details identifying particular aspects of the application environment 100 during particular times of operation.

Likewise, the launcher 620 may further create the sensors 630 and/or the control points 632 such as the load balancers 202 (FIG. 2) which reside within various nodes 112 of the application environment 100, the cluster agents 400 (FIG. 4) which control scaling and operation of the clusters 110, etc. Alternatively, the sensors 630 and/or control points 632 may already exist within the application environment 100 (e.g., previously deployed, available from third party service(s), combinations thereof, etc.).

It should be appreciated that certain off-the-shelf tools may facilitate deployment and/or operation of the sensors 630 and/or control points 632. Examples include service mesh and/or application deployment tools. Istio is suitable for implementing certain service mesh features. Prometheus is suitable for certain event monitoring and/or alerting features. Kubernetes is suitable for implementing certain deployment features.

The policy worker 622 is constructed and arranged to communicate with the various components in the view 600. In particular and as will be explained in further detail shortly, the policy worker 622 obtains application environment metrics 230 from the sensors 630 (also see FIGS. 2 and 3). Additionally, the policy worker 622 provides data relating to the application environment metrics 230 to the policy server 624 and the repository 626. Furthermore, the policy server 624 receives resource deployment configurations from the policy server 624 and deploys the resource deployment configurations to the control points 632.

The policy server 624 is constructed and arranged to apply data of application environment metrics 230 obtained from the policy worker 622, and generate new load balancing configurations for modifying operation of the load balancers 202 going forward. In some arrangements, the policy server 624 maintains a policy engine 640 which is equipped with a model that routinely receives the data of the application environment metrics 230 as state details (i.e., input), and provides new resource deployment configurations as action details (i.e., output for the current input).

In accordance with certain embodiments, the policy server 624 further includes a training component 650, and the model of the policy engine 640 is periodically trained. As will be explained in further detail shortly, such training may involve updating the model with information from the repository 626. Suitable training methodologies include, among others, algorithmic implementations, supervised learning, unsupervised learning, reinforced learning, other machine learning techniques, combinations thereof, and so on.

The repository 626 is constructed and arranged to store state/action/reward entries 628. Such entries 428 may initially be from a template or preliminary. However, the policy worker 622 then continues to store further state/action/reward entries 628 within the repository 626 during operation of the application environment 100 (FIG. 1). Then, as just mentioned, such entries 628 may be used to periodically update the policy engine 640 of the policy server 624.

FIG. 7 shows a procedure 700 which is performed by the launcher 620 in accordance with certain embodiments. Such a procedure 700 prepares an application environment 100 (FIG. 1) to control workload placement of an application 102.

At 702, the launcher 620 receives a launch command. Such a command may be provided by an administrator as part of an initial setup routine.

At 704, the launcher 620 creates the policy worker 622 and the policy server 624. In some arrangements, the launcher 620 may create other components such as the repository 626 and/or the sensors 630 if such components are not already in place. It should be understood that various components 610 such as the policy worker 622, the policy server 624, and the repository 626 may be co-located within application environment 100 to minimize disruption in communications between. However, such components 610 may also be distributed within the application environment 100, e.g., at various locations within the cloud to take advantage of processing power, connectivity, scaling features, etc.

At 706, the launcher 620 configures the nodes 112 for sensing and delivery of particular application environment metrics 230. In accordance with certain embodiments, such application environment metrics 230 may include, among others, network traffic conditions, number of connections from source to destinations, latency, throughput, server loads, and the like.

FIG. 8 shows a flowchart of a procedure 800 which is performed by the policy worker 622 in accordance with certain embodiments. It should be understood that the procedure 800 may operate continuously to enable the application 102 running in the application environment 100 to self-adjust in an ongoing manner over time. FIG. 9 shows a view 900 of particular flows that occur and reference will be made to FIG. 9 when discussing the procedure 800 in further detail.

At 802, the policy worker 622 obtains a resource deployment configuration from the policy server 624 (arrow 902 in FIG. 9) and deploys the resource deployment configuration to control points 632 among the nodes 112 (arrow 904 in FIG. 9). Along these lines, the resource deployment configuration may include sets of load balancing configurations, sets of compute node configurations, sets of pod configurations, combinations thereof, and so on. This resource deployment configuration may be referred to as action details or simply an action.

Upon receipt of at least a respective portion of the resource deployment configuration from the policy worker 422, control points 632 modify their operation in accordance with the new resource deployment configuration details. For example, the load balancers 202 may modify their operation in accordance with the new load balancing weights or adjust their endpoints. As another example, the cluster agents 400 may scale compute resources such as the number of allocated nodes 332 and/or pods 334 in their respective clusters 110. Accordingly, the behavior of the application 100 may improve based on the newly deployed resource deployment configuration.

It should be understood that the resource deployment configuration is described above as including load balancer and cluster details by way of example. However, other resource deployment changes may occur in place of or in addition to those mentioned above. For example, one or more of the load balancers 202 may be directed to switch from performing random load balancing to weighted round robin load balancing, one or more other load balancers 202 may be directed to switch from weighted round robin load balancing to favor the least loaded cluster 110, and so on. Additionally, one or more new clusters 110 may begin operation or wind down operation to further scale capacity.

At 804, the policy worker 622 obtains application environment metrics 230 from the sensors 630 during a sample time window (arrow 906 in FIG. 9). Such a sample time window may be measured by a sample timer. A variety of amounts of times are suitable for the sample time window (e.g., 5 minutes, 15 minutes, 30 minutes, 1 hour, 2 hours, etc.).

At 806, the policy worker 622 provides data from the application environment metrics 230 to the policy server 624 (arrow 908 in FIG. 9). Along these lines, the policy work 622 may provide the raw application environment metrics 230 to the policy server 624. Alternatively, the policy work 622 may process the application environment metrics 230 (e.g., sum or tally certain metrics, compute or flag certain observations within the metrics, filter out or emphasize certain metrics relating to certain events, and so on). This instance of application environment metrics 230 provided to the policy server 624 may be referred to as state details or simply a state.

As mentioned earlier, in response to the data from the application environment metrics 230, the policy server 624 creates a new resource deployment configuration. In some arrangements, the state is applied to a model (e.g., see the policy engine 640 in FIG. 9) which outputs a new action as the new resource deployment configuration.

At 808, the policy worker 622 computes a set of results based on the action from 802 and the resulting state from 804. Such a set of results may be referred to as reward details or simply a reward. For example, a range of 0 to 1 may be used where 1 indicates a maximum improvement in the state in response to the action, and 0 indicates no improvement in the state in response to the action. The policy worker 622 then provides the action, the state, and the reward to the repository 626 (arrow 910 in FIG. 9) which is then stored as an entry 628 (i.e., a trajectory) in the repository 626.

At this point, 808 proceeds back to 802. Accordingly, the policy worker 622 repeats the procedure 800 for a new action from the policy server 624.

FIG. 10 shows a flowchart of a procedure 1000 which is performed by the policy server 624 in accordance with certain embodiments. It should be understood that the procedure 1000 may operate periodically to update a model of the policy engine 640 over time.

At 1002, the policy server 624 determines whether the repository 626 has stored a predefined number of new entries 628 for a new training iteration. Such a determination may be made via a counter that counts newly received states from the policy worker 622. If the training size has not yet been reached, 1002 waits (or loops) until the training size is reached. Once the training size is reach (i.e., the training component 650 detects that the repository 626 has stored a total number of new entries 628 equaling a predefined training size), 1002 proceeds to 1004 to begin a training session to train a model of the policy engine 640.

At 1004, the policy server 624 begins the training session by accessing the repository 626. In particular, the training component 650 accesses the entries 628 (e.g., state/action/reward trajectories) from the repository 626 (arrow 920 in FIG. 9).

At 1006, the policy server 624 updates the model. Such an update process may involve standard artificial intelligence teaching techniques. It should be appreciated that the particular combination of application environment metrics 230 (i.e., which parameters) that are sensed and adjusted may result in particular effectiveness in improving application performance.

In certain embodiments, the model includes a neural network and the training component 650 performs reinforcement learning. However, it should be understood that other training techniques are suitable for use such as making adjustments to alternative policy algorithms, utilizing other forms of artificial intelligence, and so on.

Once the training session has been completed, 1006 proceeds back to 1002. Accordingly, the policy server 624 repeats the procedure 1000 enabling the policy server 624 to self-adjust in an ongoing manner.

It should be understood that the frequency in which the controller 116 communicates with the various control points such as load balancers 202, cluster agents 402, slice operators, etc. may vary between the different types of control points and/or the same types of control points. Such the timings may be a set intervals, based on counters and/or reaching certain thresholds, use other event-driven schemes, combinations thereof, and so on.

At this point, it should be appreciated that the controller 116 may employ a Reinforcement Learning and Machine Learning based system. In accordance with certain embodiments, such a system is used and enables input/evaluation of hundreds or even thousands of monitored data inputs in a looped configuration that enables automated and ongoing self-adjustment.

Further Details

Figure 11:
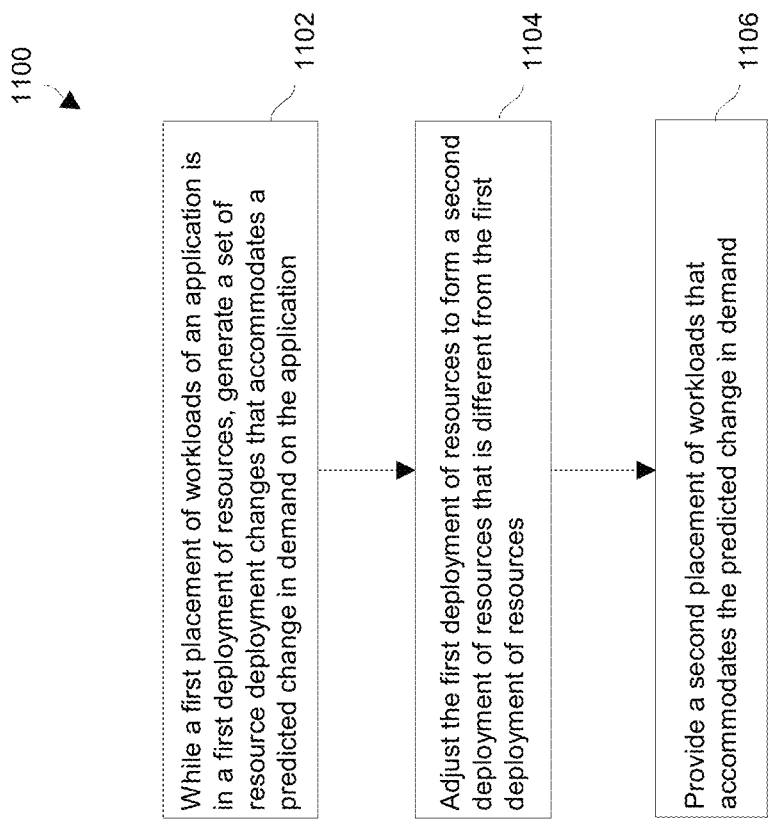
FIG. 11 is a flowchart of a procedure that controls placement of workloads in accordance with certain embodiments.

FIG. 11 is a flowchart of a procedure 1100 which is performed by a specialized circuitry of an application environment (e.g., a controller, a control plane, distributed circuitry, etc.) to control placement of workloads of an application within an application environment in accordance with certain embodiments.

At 1102, while a first placement of workloads of the application is in a first deployment of resources within the application environment, the specialized circuitry generates a set of resource deployment changes that accommodates a predicted change in demand on the application.

At 1104, the specialized circuitry adjusts the first deployment of resources within the application environment to form a second deployment of resources within the application environment, the second deployment of resources being different from the first deployment of resources.

At 1106, the specialized circuitry provides a second placement of workloads of the application in the second deployment of resources to accommodate the predicted change in demand on the application, the second placement of workloads being different from the first placement of workloads. Such operation enables the application environment to enjoy ongoing proactive self-adjustment to maintain healthy operation and avoid degradation, faults, etc.

Figure 12:
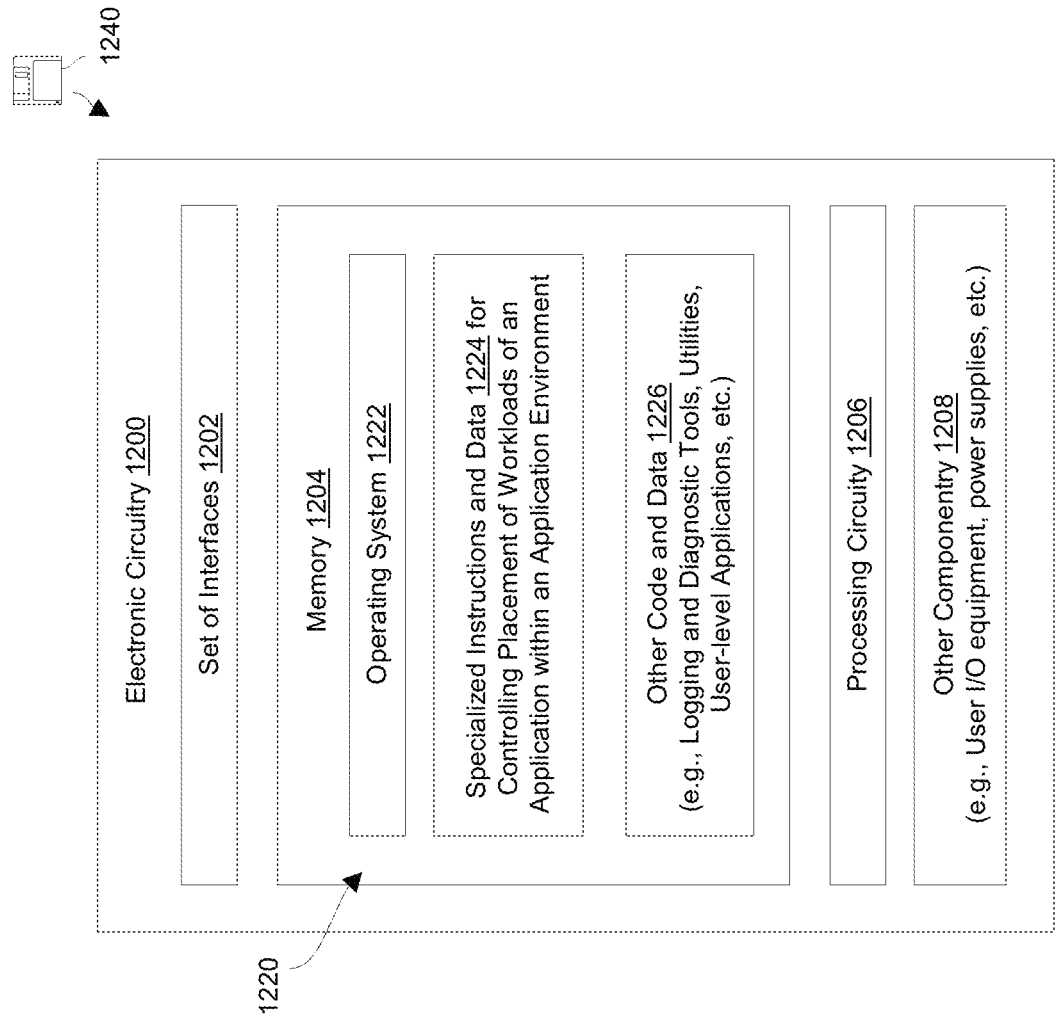
FIG. 12 is a block diagram of electronic circuitry which is suitable for use within the application environment in accordance with certain embodiments.

FIG. 12 shows electronic circuitry 1200 which is suitable for use within the application environment 100 in accordance with certain embodiments (also see FIG. 1). The electronic circuitry 1200 includes a set of interfaces 1202, memory 1204, and processing circuitry 1206, and other circuitry (or componentry) 1208.

The set of interfaces 1202 is constructed and arranged to connect the electronic circuitry 1200 to the fabric of the application environment 100 (also see FIG. 1) to enable communications with other devices of the application environment 100 (e.g., the user devices 104, the clusters 110, the nodes 112, etc.). Such communications may be IP-based, SAN-based, cellular-based, cable based, fiber-optic based, wireless, combinations thereof, and so on.

Accordingly, the set of interfaces 1202 may include one or more computerized interfaces. Accordingly, the set of interfaces 1002 enables the electronic circuitry 1200 to robustly and reliably communicate with other external apparatus.

The memory 1204 is intended to represent both volatile storage (e.g., DRAM, SRAM, etc.) and non-volatile storage (e.g., flash memory, magnetic memory, etc.). The memory 1204 stores a variety of software constructs 1220 including an operating system 1222, specialized instructions and data 1224, and other code and data 1226. The operating system 1222 refers to particular control code such as a kernel to manage computerized resources (e.g., processor cycles, memory space, etc.), drivers (e.g., an I/O stack), and so on. The specialized instructions and data 1224 refers to particular instructions for controlling placement of workloads of an application 102 within an application environment 100. In some arrangements, the specialized instructions and data 1224 is tightly integrated with or part of the operating system 1222 itself. The other code and data 1226 refers to applications and routines to provide additional operations and services (e.g., data logs, diagnostics, traces, etc.), user-level applications, administrative tools, utilities, and so on.

The processing circuitry 1206 is constructed and arranged to operate in accordance with the various software constructs 1220 stored in the memory 1204. As will be explained in further detail shortly, the processing circuitry 1206 executes the operating system 1222 and the specialized code 1224 to form specialized circuitry that robustly and reliably provides load balancing self-adjustment within an application environment 100 (FIG. 1). Such processing circuitry 1206 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on.

In accordance with certain embodiments, the electronic circuitry 1200 is optimized for processing artificial intelligence/neural net related operations. Along these lines, the processing circuitry 1206 may include specialized co-processing and related neural net architectures, GPUs, and/or other related neural net/AI hardware for training and/or operating deep learning and related systems.

In the context of one or more processors executing software, a computer program product 1240 is capable of delivering all or portions of the software constructs 1220 to the electronic circuitry 1200. In particular, the computer program product 1240 has a non-transitory (or non-volatile) computer readable medium which stores a set of instructions that controls one or more operations of the electronic circuitry 1200. Examples of suitable computer readable storage media include tangible articles of manufacture and apparatus which store instructions in a non-volatile manner such as DVD, CD ROM, flash memory, disk memory, tape memory, and the like.

The other componentry 1208 refers to other hardware of the electronic circuitry 1200. Along these lines, the electronic circuitry 1200 may include special user I/O equipment (e.g., a display, a keyboard, etc.), power supplies and battery backup units, auxiliary apparatuses, other specialized data storage componentry, etc.

It should be further understood that certain portions of the electronic circuitry 1000 may reside within one or more other components of the application environment such as a user device 104, a cluster 110, a node 112, etc). In accordance with certain embodiments, the electronic circuitry 1200 resides on multiple apparatus for high availability.

As described above, improved techniques are directed to controlling placement of workloads of an application 102 within an application environment 100 by predicting a future change in demand on the application 102. Such predicting enables proactive scaling of resources within the application environment 100 ahead of an actual change in demand thus efficiently applying resources and avoiding fault events (e.g., non-compliance). With such improved techniques, the application environment 100 is able to provide more efficient and effective performance (e.g., improved traffic flow, lower latency, higher throughput, optimized connections, better balanced server loads, cost effectiveness, fault avoidance, combinations thereof, etc.). Moreover, such techniques are able to improve application performance automatically thus avoiding drawbacks such as ineffective and wasteful overprovisioning and/or situations of having to react to encountered degraded/fault conditions.

While various embodiments of the present disclosure have been particularly shown and described, it will be understood by those skilled in the art that various changes in form and details may be made therein without departing from the spirit and scope of the present disclosure as defined by the appended claims.

Along these lines and as explained above, it should be understood that the application environment 100 is well suited for both applications that use a microservices architecture as well as monolithic applications. Accordingly, the clusters 110 may take any scale (e.g., data centers, cloud platforms, individual server devices, etc.).

It should be understood that certain embodiments are directed to systems and methods for reinforcement learning/ machine learning based workflows for application group policies.

It should be appreciated that applications deployed at the cloud and edge aim to take advantage of the proximity of the deployment to the user, thus ensuring higher throughput and lower latency application performance which in turn improves user experience. The performance of the applications depends on the underlying network connecting the different components of the software. To fully take advantage of the edge and cloud based application deployments, the network parameters need to be fine-tuned depending on different parameters like network traffic conditions, number of connections from source to destinations, latency, throughput, server loads and various other parameters.

As the size of the deployment grows in the number of servers, connections, microservices, etc., the total number of parameters to optimize grows at a large rate that makes it impossible to manually adjust them. This in turn causes degraded application performance resulting in poor end user experience. To mitigate this, operators usually deploy more network resources to improve performance thus increasing cost of deployment and operation. However, due to the dynamic nature of the underlying network and resource usages in the deployment, optimizations have to be done on an ongoing basis. The turnaround time required to analyze the problem and come up with different solutions that work may also be unacceptable in most cases.

The application environment with the different software components' lifecycle and operation, and the underlying network is modeled as a Reinforcement Learning system. A Reinforcement Learning and Machine Learning based system can learn the effect of the different parameter settings in the different states of an arbitrarily large application environment that can produce optimum performance for each of the application groups in real time. The operator can specify different policies for each of the application groups and the RL based system can learn to optimize the underlying network and application parameters to meet the policy objectives. The RL based system will operate alongside the application non-intrusively and will continually provide actions that are applied to the application environment such that the overall application group policy objectives are met.

The RL based system can be applied to applications deployed in a star, mesh and other arbitrary network topologies with single or multiple connections from clients (sources) and servers (destinations). The RL based system can be employed in an application deployed as containerized microservices or as execution environments in a virtual/bare-metal machine. The application network can be realized either as a network service mesh/slice or as direct network connections without an underlying mesh or a slice.

In some embodiments, the weights of a load balancer deployed in a network that connects different application software components are continuously modified by the RL system over time depending on the network parameters like latency and throughput, to ensure that application performance objectives are met.

The applications may be using TCP, UDP or HTTP network protocols over the application network.

An application network is a dynamic environment with changing traffic conditions, network latencies, network throughput, resource consumption within each of the application components.

Operators of the network and applications rely on analytics provided by the network operators and their own software to understand where optimizations can be made. In most cases, application networks are started in their default configurations and over time operators of the network and developers of the application software analyze metrics to propose improvements or fixes to problems. Also, in most cases, both network and application resources are over-provisioned to begin with and rely on cloud and edge providers to provide them insight into the different metrics or to provide hooks to dynamically or manually adjust resources in the deployment.

As the application components grow in number and the number of connectivity between their different components increase, the number of parameters in the network and application components can grow at a very fast rate. Adjusting the large number of parameters manually or as determined by offline statistical or analytical methods takes time and the effectiveness of the predicted parameters decreases with passing time. Furthermore, the exercise has to be repeated over the lifetime of the applications. This approach is sub-optimal, error prone, time consuming and not flexible to accommodate multiple and varying performance objectives.

In accordance with certain embodiments, the Reinforcement Learning based system used for application group policies includes:

A component that provides a set of metrics that are available from the environment in real time that can be used to describe the state of the environment in which the application is operating. These metrics are ingested by the RL system and are input to the algorithm that is learning to predict optimal settings or actions. The RL system uses network latency and throughput, application resource utilizations like CPU and memory, current time and other metrics.

An enforcement point(s) in the application network that modifies the behavior of the environment. In one aspect of the environment, this enforcement point is a Load Balancer software that connects different components like sources and destinations in the application. The output of the RL system is a set of actions that are applied to the enforcement point.

An RL policy algorithm that is trained on the metrics generated by the environment and learns over time to map the state of the environment to the optimum action like the set of weights that are applied to the load balancer.

The operation of the RL system is as follows:

The enforcement point(s) and the topology of the application network are determined from the deployment and provided to the RL system.

The RL policy algorithm which incorporates a deep learning model that has many parameters (weights) that are adjusted during training. The deep learning model outputs an action to be taken (set of weights for the load balancer) for a given input state.

The state input and its corresponding output from the RL policy model is computed every step duration.

The RL algorithm is trained over time by providing the feedback of its actions as rewards. A trajectory of (state, action, reward) for each step of the algorithm is saved for training at a later time. The duration of each step and training is a configurable parameter.

The reward system of the algorithm is a function of the overall application policy objective as input by the operator of the network.

The algorithm optimizes the RL policy by adjusting its model parameters depending on the (state, action, reward) sequences. For a positive reward, the model parameters are adjusted by taking the gradient of the loss function of the algorithm to the input state and adding the gradient to the model parameters. For a negative reward, the model parameters are adjusted in the negative direction. In this way, over time, the RL system is able to better predict and adjust the parameters of the environment to meet the overall objective. The RL system is able to scale to handle any application network of arbitrary number of connected services.

It will learn over time to optimize the network and application performance to meet the overall objective without the intervention of any operator.

The RL system will continuously operate and adapt to any changes in the environment, topology and other parameters. It can handle application networks implemented over several network protocols including TCP, HTTP and UDP.

The RL system can autonomously operate and learn the different parameters that need to be adjusted to optimize the performance of the application network. It can handle any changes in application deployment and adapt accordingly.

There are many components in the RL system. The component responsible to read the metrics from the application environment can be implemented in different ways.

The communication mechanism from the RL system to the components responsible to program the actions could be implemented in different ways.

The RL system can be a standalone application or could be part of the application environment without changing the end result.

The duration of the step in the algorithm could be modified to better suit the application environment dynamics.

The topology of the application network can be reduced to a different representation of topology in the algorithm but the RL system can still be employed in the same way.

Additional Details

In accordance with certain embodiments, workload placement deals with the problem of finding the best resource for running computation units of an application. The resources needed for the units of an application could be compute, memory, network latency and bandwidth, favorable geographic region or data center, cost of resources in deployed infrastructure, other non-standard resources like transport control blocks in TCP connections, etc.

In frameworks that are available in current infrastructure and platforms, applications are deployed and application level metrics like request timeouts are monitored. Applications employ circuit breakers and retries in an attempt to address issues in any of the different parameters. In some cases, geographic diversity is achieved by deploying applications across different regions which will take care of problems in certain data centers like outages.

Although several forms of workload placement schemes may be contemplated, there is a need to place application units taking into account several parameters such as time varying network conditions, compute resource availability and cost of hosting within an application slice. The workflows to configure and set up the application slices, the parameters to monitor for workloads and the performance and QoS objectives to be met for optimal workload placement within the application slices do not exist today.

Applications are complex and depend on many factors for optimal performance, such as network bandwidth, latency, compute resources, etc. In addition to making sure all these factors are taken into account, cost of deployment is an important factor for operators. It is a very tedious, time consuming, error prone and manual process to create a deployment that takes into consideration all these factors and optimizes for them to reduce cost and provide a good quality of service. In most cases, this simply cannot be done due to the complexity and due to seemingly conflicting constraints. For example, increasing the number of replicas of application units to get better request throughput may increase network delays due to too many simultaneous requests on an already poor network latency path to these replicas, causing further reduction in throughput. Also, the workflows for setting up the configuration for application slices and the parameters to monitor for workloads while meeting a certain performance objective within the application slice do not exist.

In accordance with certain embodiments, the following elements form a system that includes a combination of an application and workload placement policy configuration workflow, an intelligent workload placement engine and a smart autoscaling engine:

1. An application slice where the application is deployed. An application slice is an isolated namespace that creates an overlay network that is cloud agnostic on a set of clusters where applications can be deployed.
2. An intelligent workload placement engine that monitors one or metrics as defined by the operator and performs resource selection and scaling based on the current state of the environment in which the application is deployed.
3. A way of specifying the performance objective for the application that needs to be met which is part of the application slice setup and configuration. For example, providing minimum network latency QoS from the clients to the application servers or a maximum cost threshold/budget for virtual machines (VMs).
4. An algorithm that improves over time by reducing the error in the prediction of the selection of resource endpoints.
5. An intelligent predictive autoscaler component that monitors one or more metrics of the deployed environment and performs predictive autoscaling of compute resources that are needed by the application.

FIG. 3(B) shows an initial configuration of an application in deployment. The workloads (residing in pods) are running in a cluster 110(1) since the cost of resources in the cluster 110(1) is less than that of other available clusters 110 such as the cluster 110(2).

FIG. 3(C) shows workloads moving (or migrating) from the cluster 110(1) to the cluster 110(2) as the cost of resources in the cluster 110(2) become less than the cost of resources in the cluster 110(1). This is accomplished by removing the cluster 110(1) endpoint and adding the cluster 110(2) endpoint in the load balancer configuration that the controller 116 provides to the load balancer 202.

Figure 13A:
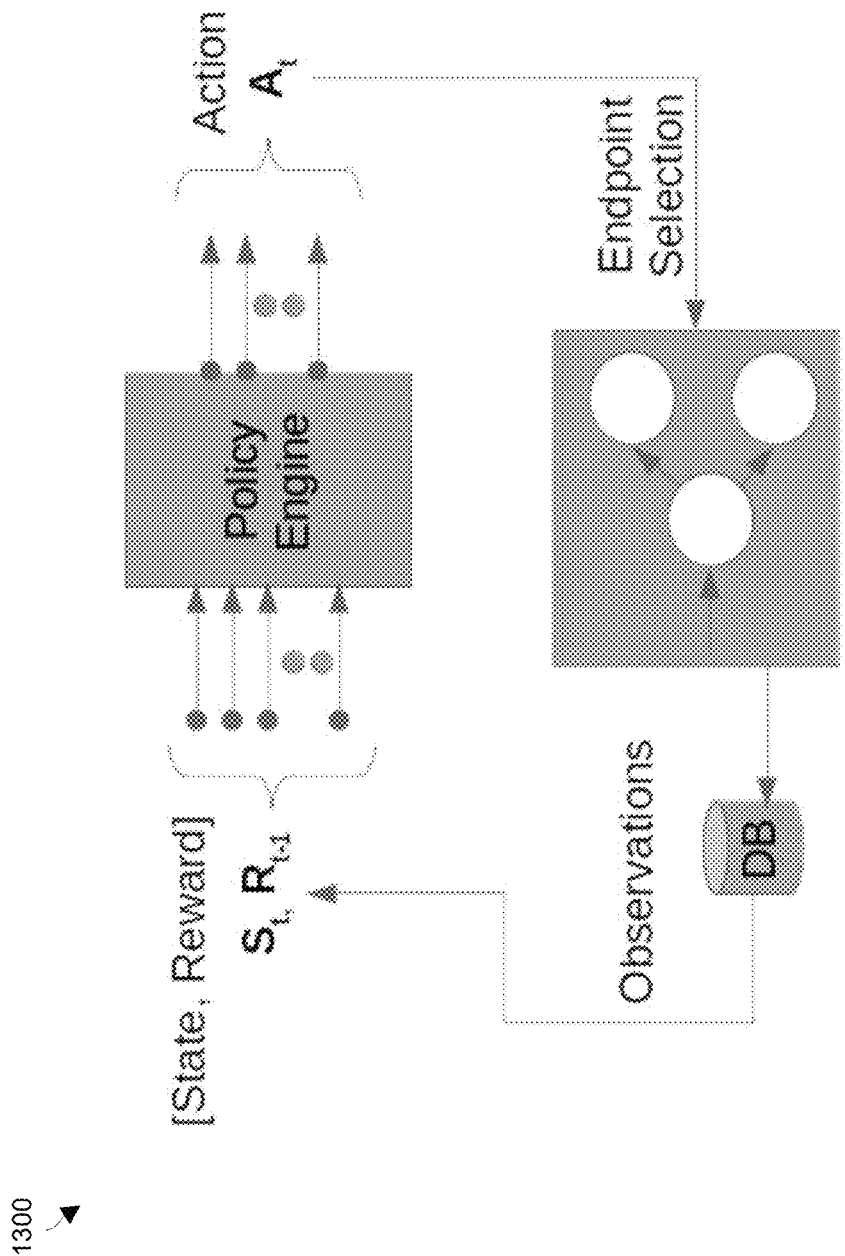
FIG. 13(A) is a diagram of a workflow that enables workload placement for applications within a slice environment in accordance with certain embodiments.

FIGS. 13(A) and 13(B) show a workflow 1300 and a procedure 1330 that enables workload placement for applications within a slice environment in accordance with certain embodiments. The workflow 1300 (FIG. 13(A)) has the same structure as that described earlier for programming [state, reward] pairs and/or RL. The procedure 1330 (FIG. 13(B)) provides for or includes the following:

1. At 1340, a system to configure and enable application deployment prompts the operator to create the policies for workload placement.
2. At 1350, the operator will provide metrics and their thresholds for the workloads to run optimally.
3. At 1360, the operator will also provide the overall QoS objective that needs to be maintained while the workloads are using a set of resources.
4. At 1370, the operator will also select or provide certain parameters for the workload placement algorithm.
5. At 1380, the operator will also select or provide certain parameters for the autoscaling of the application components within the clusters where they will be running.

The order of activities may differ in accordance with certain embodiments.

Figure 14:
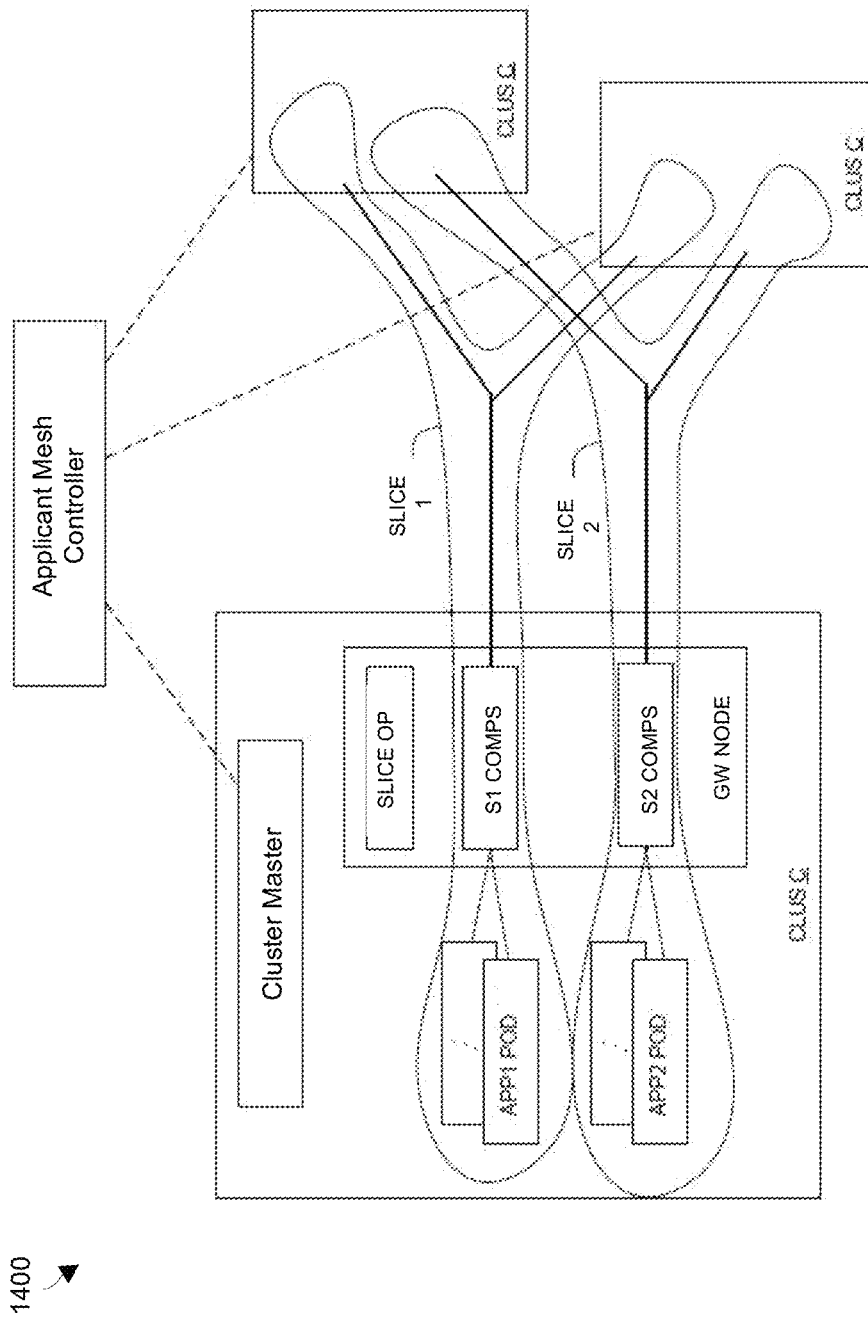
FIG. 14 is a diagram of an example application environment having multiple application slices in accordance with certain embodiments.

FIG. 14 shows an example application environment 1400 having multiple application slices.

In accordance with certain embodiments, a workload placement technique makes predictions about the most optimal resources based on the configured metrics using a closed loop algorithm. It ingests the different metrics of the application provided by an application slice and the application environment in which it is running and creates a state variable. This is used along with the error in previous prediction (the reward) to predict the next action. The action is the resource endpoint that needs to be selected for the workloads to be placed.

For example, the current state of the environment may be the cost of the resources where the application units are currently running. The current reward may be a positive reward if the previous action was correctly taken, i.e, the cost of the new resources were indeed lower and they also met the QoS objectives of the application, or negative, if the previous reward was not favorable. The action may be the IP address of the new cluster endpoint in a new data center region where the VMs are lower cost compared to the currently utilized cluster. This IP address may be updated as an endpoint in a load balancer or a DNS resolver in front of the application.

While the application is running in the endpoint clusters, the resources are also scaled up or down by predictive autoscaler circuitry (e.g., that may apply a predictive autoscaler algorithm), which optimally selects the most cost efficient instances that meet the performance objectives.

The predictive autoscaler circuitry runs a closed loop algorithm by ingesting metrics related to the performance of the workloads running in the cluster. It predicts the number of workload units that need to be scaled up or down.

The predictive autoscaler circuitry ingests the different metrics of the workloads and the cluster environment in which it is running and creates a state variable. This is used along with the error in previous prediction (the reward) to predict the next action. The action is the number of workload units and the machine level resources that need to be scaled up or down from the current level.

For all state space definitions, the following metrics are taken into account:
  1. Infrastructure metrics
  2. Application metrics
  3. QoS metrics
  4. Other variables (Time/Day/Periodicity, Current Autoscaling Parameters—min, max, no. of Pods/VMs currently running etc.)

The prediction of the autoscaler is done taking into account the performance objective that needs to be maximized or minimized. For example, the performance objective may be the maximum threshold of the number of request timeouts per second that occur in the application.

Over time, the predictive autoscaler circuitry learns to predict more accurately by minimizing the error in prediction in each step. This is done by defining a reward variable, which is positive if it meets the performance objective of the application or negative otherwise. For example, the reward can be dependent on the linear combination of cost of resources predicted, utilization of the resources and the number of errors seen. It tries to minimize cost, maximize utilization of resources and minimize number of errors.

There are many variables that affect the performance of an application in a deployment. It is very difficult to fine tune all these variables to achieve the optimal performance, not to mention the time varying nature of these variables.

In accordance with certain embodiments, specialized circuitry continuously adapts to the time changing environment and predicts the amount of resources and where they need to be deployed in an autonomous manner. Such specialized circuitry provides one or more specialized features such as continuous adaptation of the algorithm over time, autonomous operation, prediction of optimal resource allocation and scaling and optimal endpoint locations where to deploy applications, automation of the allocation and/or LB/application tuning, self-adjustment, combinations thereof, etc.

Such modifications and enhancements are intended to belong to various embodiments of the disclosure.

What is claimed is:

1. A method of controlling placement of workloads of an application within an application environment, the method comprising:
  while a first placement of workloads of the application is in a first deployment of resources within the application environment, (1) at regular intervals based on a sample timer, proactively predicting a change in demand on the application automatically and transparent to users of the application, and (2) generating a set of resource deployment changes that accommodates the predicted change in demand on the application, the resource deployment changes being generated based on application environment metrics from clusters in which the resources are deployed;
  adjusting the first deployment of resources within the application environment based on the resource deployment changes to form a second deployment of resources within the application environment, the second deployment of resources being different from the first deployment of resources; and
  providing a second placement of workloads of the application in the second deployment of resources to accommodate the predicted change in demand on the application, the second placement of workloads being different from the first placement of workloads.

2. The method as in claim 1 wherein the application environment includes a plurality of clusters, each cluster of the plurality of clusters providing computing resources that are virtualized into containers which are arranged into pods; and
  wherein adjusting the first deployment of resources within the application environment to form the second deployment of resources within the application environment includes:
    changing a number of pods allocated to the application by a cluster of the plurality of clusters of the application environment.

3. The method as in claim 2 wherein the cluster includes an initial number of pods allocated to the application and a pod scaling circuit; and
  wherein changing the number of pods allocated to the application by the cluster includes:
    providing a signal to the pod scaling circuit that directs the pod scaling circuit to increase the number of pods allocated to the application by the cluster from the initial number of pods to a target number of pods that is greater than the initial number of pods to proactively address the predicted change in demand on the application.

4. The method as in claim 1 wherein the application environment includes a plurality of clusters, each cluster of the plurality of clusters providing computing resources on compute nodes; and
  wherein adjusting the first deployment of resources within the application environment to form the second deployment of resources within the application environment includes:
    changing a number of compute nodes allocated to the application by a cluster of the plurality of clusters of the application environment.

5. The method as in claim 4 wherein the cluster includes a plurality of compute nodes and a node scaling circuit; and
  wherein changing the number of compute nodes allocated to the application by the cluster includes:

providing a signal to the node scaling circuit that directs the node scaling circuit to increase a first number of compute nodes allocated to the application by the cluster to a second number of compute nodes allocated to the application by the cluster to proactively address the predicted change in demand on the application.

6. The method as in claim 1 wherein the application environment includes a first cluster and a second cluster, each of the first cluster and the second cluster providing computing resources;

wherein, prior to adjusting, the first cluster is allocated to the application and the second cluster is not allocated to the application; and wherein adjusting the first deployment of resources within the application environment to form the second deployment of resources within the application environment includes:

allocating the second cluster to the application.

7. The method as in claim 6 wherein the application environment further includes a load balancing circuit;

wherein, prior to allocating the second cluster to the application, the load balancing circuit sends traffic for the application to the first cluster and does not send traffic for the application to the second cluster; and wherein allocating the second cluster to the application includes:

setting up the second cluster to process at least some traffic for the application from the load balancing circuit.

8. The method as in claim 1 wherein generating the set of resource deployment changes includes:

creating the set of resource deployment changes based on network traffic conditions, numbers of connections from sources to destinations, latency, throughput, server loads, QoS metrics, and resource deployment costs of the application environment.

9. The method as in claim 1 wherein the application environment includes a plurality of clusters, each cluster of the plurality of clusters providing computing resources on compute nodes in response to control from a cluster control circuit; and wherein adjusting includes:

sending a set of commands from a workload placement engine to a set of cluster control circuits of a set of clusters of the plurality of clusters to change the first deployment of resources within the application environment to the second deployment of resources within the application environment.

10. The method as in claim 1 wherein the application environment includes a plurality of clusters, each cluster of the plurality of clusters providing computing resources on compute nodes in response to control from a container orchestration system; and wherein adjusting includes:

sending a set of commands from a workload placement engine to a set of container orchestration systems of a set of clusters of the plurality of clusters to change the first deployment of resources within the application environment to the second deployment of resources within the application environment.

11. The method as in claim 1 wherein the application environment includes a set of application slice operators that controls a set of application slices deployed within the application environment; and wherein adjusting includes:

sending a set of commands from a workload placement engine to the set of application slice operators to change the first deployment of resources within the application environment to the second deployment of resources within the application environment.

12. The method as in claim 1 wherein the application environment includes a plurality of clusters, each cluster of the plurality of clusters providing computing resources that are virtualized into containers which are arranged into pods; and wherein providing the second placement of workloads of the application in the second deployment of resources includes placing a workload of the application in a new pod.

13. The method as in claim 1 wherein the application environment includes a plurality of clusters, each cluster of the plurality of clusters providing computing resources that are virtualized into containers which are arranged into pods; and wherein providing the second placement of workloads of the application in the second deployment of resources includes placing a workload of the application in a virtual machine residing in a new pod.

14. The method as in claim 1 wherein the application environment includes a plurality of clusters, each cluster of the plurality of clusters providing computing resources on compute nodes;

wherein providing the second placement of workloads of the application in the second deployment of resources includes placing, as a workload of the application, a virtual machine on a compute node.

15. The method as in claim 1 wherein the application environment includes a workload placement engine constructed and arranged to generate resource deployment changes; and wherein generating the set of resource deployment changes includes:

operating the workload placement engine to generate the set of resource deployment changes based on application environment state information from the application environment.

16. The method as in claim 15 wherein operating the workload placement engine includes:

running the workload placement engine on a central server within the application environment.

17. The method as in claim 15 wherein the application environment further includes a plurality of clusters, each cluster of the plurality of clusters providing computing resources on compute nodes; and wherein operating the workload placement engine includes:

running the workload placement engine in a distributed configuration among clusters of the plurality of clusters of the application environment.

18. The method as in claim 15 wherein the application environment further includes a plurality of clusters, each cluster of the plurality of clusters providing computing resources on compute nodes; and wherein adjusting the first deployment of resources within the application environment to form a second deployment of resources within the application environment includes:

providing communications from the workload placement engine to the plurality of clusters of the application environment through an overlay network to provide network traffic isolation.

19. Electronic circuitry, comprising:
memory; and
control circuitry coupled to the memory, the memory storing instructions which, when carried out by the control circuitry, cause the control circuitry to perform a method of:
while a first placement of workloads of an application is in a first deployment of resources within an application environment, (1) at regular intervals based on a sample timer, proactively predicting a change in demand on the application automatically and transparent to users of the application, and (2) generating a set of resource deployment changes that accommodates the predicted change in demand on the application, the resource deployment changes being generated based on application environment metrics from clusters in which the resources are deployed,
adjusting the first deployment of resources within the application environment based on the resource deployment changes to form a second deployment of resources within the application environment, the second deployment of resources being different from the first deployment of resources, and
providing a second placement of workloads of the application in the second deployment of resources to accommodate the predicted change in demand on the application, the second placement of workloads being different from the first placement of workloads.

20. A computer program product having a non-transitory computer readable medium which stores a set of instructions to control placement of workloads of an application within an application environment; the set of instructions, when carried out by computerized circuitry, causing the computerized circuitry to perform a method of:
while a first placement of workloads of the application is in a first deployment of resources within the application environment, (1) at regular intervals based on a sample timer, proactively predicting a change in demand on the application automatically and transparent to users of the application, and (2) generating a set of resource deployment changes that accommodates the predicted change in demand on the application, the resource deployment changes being generated based on application environment metrics from clusters in which the resources are deployed;
adjusting the first deployment of resources within the application environment based on the resource deployment changes to form a second deployment of resources within the application environment, the second deployment of resources being different from the first deployment of resources; and
providing a second placement of workloads of the application in the second deployment of resources to accommodate the predicted change in demand on the application, the second placement of workloads being different from the first placement of workloads.

\* \* \* \* \*